(12) United States Patent
Vespe et al.

(10) Patent No.: US 9,892,132 B2
(45) Date of Patent: Feb. 13, 2018

(54) DETERMINING GEOGRAPHIC LOCATIONS FOR PLACE NAMES IN A FACT REPOSITORY

(71) Applicant: GOOGLE INC., Mountain View, CA (US)

(72) Inventors: David J. Vespe, New York, NY (US); Andrew Hogue, Ho Ho Kus, NJ (US)

(73) Assignee: Google LLC, Mountain View, CA (US)

( * ) Notice: Subject to any disclaimer, the term of this patent is extended or adjusted under 35 U.S.C. 154(b) by 698 days.

(21) Appl. No.: 13/732,157

(22) Filed: Dec. 31, 2012

(65) Prior Publication Data

US 2013/0191385 A1     Jul. 25, 2013

Related U.S. Application Data

(63) Continuation of application No. 11/686,217, filed on Mar. 14, 2007, now Pat. No. 8,347,202.

(51) Int. Cl.
*G06F 17/00*     (2006.01)
*G06F 17/30*     (2006.01)
*G06F 17/27*     (2006.01)

(52) U.S. Cl.
CPC ...... *G06F 17/30241* (2013.01); *G06F 17/278* (2013.01); *G06F 17/2765* (2013.01); *G06F 17/30253* (2013.01); *G06F 17/30861* (2013.01)

(58) Field of Classification Search
CPC ............. G06F 17/278; G06F 17/30241; G06F 17/30861; G06F 17/30253; G06F 17/2765
(Continued)

(56) References Cited

U.S. PATENT DOCUMENTS 4,888,690 A    12/1989   Huber
4,899,292 A    2/1990   Montagna et al.
(Continued)

FOREIGN PATENT DOCUMENTS

DE     10245900 A1    4/2004
JP      5-174020 A     7/1993
(Continued)

OTHER PUBLICATIONS

Kevin S. McCurley, "Geospatial Mapping and Navigation of the Web", May 1-5, 2001, Hong Kong, ACM 1-58113-348-0/01/0005, pp. 9.*

(Continued)

*Primary Examiner* — Chau Nguyen
(74) *Attorney, Agent, or Firm* — Brake Hughes Bellerman LLP

(57) ABSTRACT

A system and method for tagging place names with geographic location coordinates, the place names associated with a collection of objects in a memory of a computer system. The system and method process a text string within an object stored in memory to identify a first potential place name. The system and method determine whether geographic location coordinates are known for the first potential place name. The system and method identify the first potential place name associated with an object in the memory as a place name. The system and method tag the first identified place name associated with an object in the memory with its geographic location coordinates, when the geographic location coordinates for the first identified place name are known. The system and method disambiguate place names when multiple place names are found.

19 Claims, 15 Drawing Sheets

(58) Field of Classification Search
USPC .......... 715/200, 205–208, 211, 234, 760
See application file for complete search history.

(56) References Cited

U.S. PATENT DOCUMENTS

| | | | |
|---|---|---|---|
| 5,010,478 A | 4/1991 | Deran | |
| 5,133,075 A | 7/1992 | Risch | |
| 5,347,653 A | 9/1994 | Flynn et al. | |
| 5,440,730 A | 8/1995 | Elmasri et al. | |
| 5,475,819 A | 12/1995 | Miller et al. | |
| 5,519,608 A | 5/1996 | Kupiec | |
| 5,544,051 A | 8/1996 | Senn et al. | |
| 5,546,507 A | 8/1996 | Staub | |
| 5,560,005 A | 9/1996 | Hoover et al. | |
| 5,574,898 A | 11/1996 | Leblang et al. | |
| 5,675,785 A | 10/1997 | Hall et al. | |
| 5,680,622 A | 10/1997 | Even | |
| 5,694,590 A | 12/1997 | Thuraisingham et al. | |
| 5,701,470 A | 12/1997 | Joy et al. | |
| 5,717,911 A | 2/1998 | Madrid et al. | |
| 5,717,951 A | 2/1998 | Yabumoto | |
| 5,724,571 A | 3/1998 | Woods | |
| 5,778,373 A | 7/1998 | Levy et al. | |
| 5,778,378 A | 7/1998 | Rubin | |
| 5,787,413 A | 7/1998 | Kauffman et al. | |
| 5,793,966 A | 8/1998 | Amstein | |
| 5,802,299 A | 9/1998 | Logan et al. | |
| 5,815,415 A | 9/1998 | Bentley et al. | |
| 5,819,210 A | 10/1998 | Maxwell, III et al. | |
| 5,819,265 A | 10/1998 | Ravin et al. | |
| 5,822,743 A | 10/1998 | Gupta et al. | |
| 5,826,258 A | 10/1998 | Gupta et al. | |
| 5,832,479 A | 11/1998 | Berkowitz et al. | |
| 5,838,979 A | 11/1998 | Hart et al. | |
| 5,870,739 A | 2/1999 | Davis, III et al. | |
| 5,882,743 A | 3/1999 | McConnell | |
| 5,905,980 A | 5/1999 | Masuichi et al. | |
| 5,909,689 A | 6/1999 | Van Ryzin | |
| 5,920,859 A | 7/1999 | Li | |
| 5,943,670 A | 8/1999 | Prager | |
| 5,946,692 A | 8/1999 | Faloutsos et al. | |
| 5,956,718 A | 9/1999 | Prasad et al. | |
| 5,963,940 A | 10/1999 | Liddy et al. | |
| 5,974,254 A | 10/1999 | Hsu | |
| 5,987,460 A | 11/1999 | Niwa et al. | |
| 6,006,221 A | 12/1999 | Liddy | |
| 6,014,661 A | 1/2000 | Ahlberg et al. | |
| 6,018,741 A | 1/2000 | Howland et al. | |
| 6,026,388 A | 2/2000 | Liddy et al. | |
| 6,029,195 A | 2/2000 | Herz | |
| 6,038,560 A | 3/2000 | Wical | |
| 6,044,366 A | 3/2000 | Graffe et al. | |
| 6,052,693 A | 4/2000 | Smith et al. | |
| 6,064,952 A | 5/2000 | Imanaka et al. | |
| 6,073,130 A | 6/2000 | Jacobson et al. | |
| 6,078,918 A | 6/2000 | Allen et al. | |
| 6,101,515 A | 8/2000 | Wical et al. | |
| 6,105,020 A | 8/2000 | Lindsay et al. | |
| 6,105,030 A | 8/2000 | Syed et al. | |
| 6,112,203 A | 8/2000 | Bharat et al. | |
| 6,112,210 A | 8/2000 | Nori et al. | |
| 6,122,647 A | 9/2000 | Horowitz et al. | |
| 6,134,555 A | 10/2000 | Chadha et al. | |
| 6,138,270 A | 10/2000 | Hsu | |
| 6,182,063 B1 | 1/2001 | Woods | |
| 6,202,065 B1* | 3/2001 | Wills | G06F 17/3087 |
| 6,212,526 B1 | 4/2001 | Chaudhuri et al. | |
| 6,216,138 B1 | 4/2001 | Wells et al. | |
| 6,222,540 B1 | 4/2001 | Sacerdoti | |
| 6,240,546 B1 | 5/2001 | Lee et al. | |
| 6,263,328 B1 | 7/2001 | Coden et al. | |
| 6,263,335 B1 | 7/2001 | Paik et al. | |
| 6,263,358 B1 | 7/2001 | Lee et al. | |
| 6,266,805 B1 | 7/2001 | Nwana et al. | |
| 6,285,999 B1 | 9/2001 | Page | |
| 6,289,338 B1 | 9/2001 | Stoffel et al. | |
| 6,304,864 B1 | 10/2001 | Liddy et al. | |
| 6,311,189 B1 | 10/2001 | DeVries et al. | |
| 6,311,194 B1 | 10/2001 | Sheth | |
| 6,314,555 B1 | 11/2001 | Ndumu et al. | |
| 6,326,962 B1 | 12/2001 | Szabo | |
| 6,327,574 B1 | 12/2001 | Kramer et al. | |
| 6,349,275 B1 | 2/2002 | Schumacher et al. | |
| 6,363,179 B1 | 3/2002 | Evans et al. | |
| 6,377,943 B1 | 4/2002 | Jakobsson | |
| 6,397,228 B1 | 5/2002 | Lamburt et al. | |
| 6,438,543 B1 | 8/2002 | Kazi et al. | |
| 6,470,330 B1 | 10/2002 | Das et al. | |
| 6,473,898 B1 | 10/2002 | Waugh et al. | |
| 6,480,194 B1 | 11/2002 | Sang'udi et al. | |
| 6,487,495 B1 | 11/2002 | Gale et al. | |
| 6,502,102 B1 | 12/2002 | Haswell et al. | |
| 6,519,631 B1 | 2/2003 | Rosenschein et al. | |
| 6,529,900 B1 | 3/2003 | Patterson et al. | |
| 6,556,991 B1 | 4/2003 | Borkovsky | |
| 6,565,610 B1 | 5/2003 | Wang et al. | |
| 6,567,846 B1 | 5/2003 | Garg et al. | |
| 6,567,936 B1 | 5/2003 | Yang et al. | |
| 6,572,661 B1 | 6/2003 | Stern | |
| 6,578,032 B1 | 6/2003 | Chandrasekar et al. | |
| 6,584,464 B1 | 6/2003 | Warthen | |
| 6,584,646 B2 | 7/2003 | Fujita | |
| 6,594,658 B2 | 7/2003 | Woods | |
| 6,606,625 B1 | 8/2003 | Muslea et al. | |
| 6,606,659 B1 | 8/2003 | Hegli et al. | |
| 6,609,123 B1 | 8/2003 | Cazemier et al. | |
| 6,629,097 B1 | 9/2003 | Keith | |
| 6,636,742 B1 | 10/2003 | Torkki et al. | |
| 6,643,641 B1 | 11/2003 | Snyder | |
| 6,656,991 B2 | 12/2003 | Staccione et al. | |
| 6,665,659 B1 | 12/2003 | Logan | |
| 6,665,666 B1 | 12/2003 | Brown et al. | |
| 6,665,837 B1 | 12/2003 | Dean et al. | |
| 6,675,159 B1 | 1/2004 | Lin et al. | |
| 6,684,205 B1 | 1/2004 | Modha et al. | |
| 6,693,651 B2 | 2/2004 | Bicbesheimer et al. | |
| 6,704,726 B1 | 3/2004 | Amouroux | |
| 6,718,324 B2 | 4/2004 | Edlund et al. | |
| 6,738,767 B1 | 5/2004 | Chung et al. | |
| 6,745,189 B2 | 6/2004 | Schreiber | |
| 6,754,873 B1 | 6/2004 | Law et al. | |
| 6,763,496 B1 | 7/2004 | Hennings et al. | |
| 6,799,176 B1 | 9/2004 | Page | |
| 6,804,667 B1 | 10/2004 | Martin | |
| 6,820,081 B1 | 11/2004 | Kawai et al. | |
| 6,820,093 B2 | 11/2004 | de la Huerga | |
| 6,823,495 B1 | 11/2004 | Vedula et al. | |
| 6,832,218 B1 | 12/2004 | Emens et al. | |
| 6,845,354 B1 | 1/2005 | Kuo et al. | |
| 6,850,896 B1 | 2/2005 | Kelman et al. | |
| 6,868,411 B2 | 3/2005 | Shanahan | |
| 6,873,982 B1 | 3/2005 | Bates et al. | |
| 6,873,993 B2 | 3/2005 | Charlesworth et al. | |
| 6,885,990 B1 | 4/2005 | Ohmori et al. | |
| 6,886,005 B2 | 4/2005 | Davis | |
| 6,886,010 B2 | 4/2005 | Kostoff | |
| 6,901,403 B1 | 5/2005 | Bata et al. | |
| 6,904,429 B2 | 6/2005 | Sako et al. | |
| 6,928,436 B2 | 8/2005 | Baudel | |
| 6,957,213 B1 | 10/2005 | Yuret | |
| 6,961,723 B2 | 11/2005 | Faybishenko et al. | |
| 6,963,880 B1 | 11/2005 | Pingte | |
| 6,965,900 B2 | 11/2005 | Srinivasa | |
| 6,968,343 B2 | 11/2005 | Charisius et al. | |
| 6,996,572 B1 | 2/2006 | Chakrabarti et al. | |
| 7,003,506 B1 | 2/2006 | Fisk | |
| 7,003,522 B1 | 2/2006 | Reynar et al. | |
| 7,003,719 B1 | 2/2006 | Rosenoff et al. | |
| 7,007,228 B1 | 2/2006 | Carro | |
| 7,013,308 B1 | 3/2006 | Tunstall-Pedoe | |
| 7,020,662 B2 | 3/2006 | Boreham et al. | |
| 7,031,955 B1 | 4/2006 | de Souza et al. | |
| 7,043,521 B2 | 5/2006 | Eitel | |
| 7,051,023 B2 | 5/2006 | Kapur et al. | |

(56) References Cited

U.S. PATENT DOCUMENTS

| | | |
|---|---|---|
| 7,076,491 B2 | 7/2006 | Tsao |
| 7,080,073 B1 | 7/2006 | Jiang et al. |
| 7,080,085 B1 | 7/2006 | Choy et al. |
| 7,100,082 B2 | 8/2006 | Little et al. |
| 7,100,083 B2 | 8/2006 | Little et al. |
| 7,143,099 B2 | 11/2006 | Lecheler-Moore et al. |
| 7,146,536 B2 | 12/2006 | Bingham et al. |
| 7,146,538 B2 | 12/2006 | Johnson et al. |
| 7,158,980 B2 | 1/2007 | Shen |
| 7,158,983 B2 | 1/2007 | Willse et al. |
| 7,162,499 B2 | 1/2007 | Lees et al. |
| 7,165,024 B2 | 1/2007 | Glover et al. |
| 7,174,504 B2 | 2/2007 | Tsao |
| 7,181,471 B1 | 2/2007 | Ibuki et al. |
| 7,194,380 B2 | 3/2007 | Barrow et al. |
| 7,197,449 B2 | 3/2007 | Hu et al. |
| 7,216,073 B2 | 5/2007 | Lavi et al. |
| 7,233,943 B2 | 6/2007 | Modha et al. |
| 7,260,573 B1 | 8/2007 | Jeh et al. |
| 7,263,565 B2 | 8/2007 | Tawara et al. |
| 7,269,587 B1 | 9/2007 | Page |
| 7,277,879 B2 | 10/2007 | Varadarajan |
| 7,302,646 B2 | 11/2007 | Nomiyama et al. |
| 7,305,380 B1 | 12/2007 | Hoelzle et al. |
| 7,325,160 B2 | 1/2008 | Tsao |
| 7,363,312 B2 | 4/2008 | Goldsack |
| 7,376,895 B2 | 5/2008 | Tsao |
| 7,398,461 B1 | 7/2008 | Broder et al. |
| 7,403,939 B1 * | 7/2008 | Virdy .................. G06F 17/3087 707/718 |
| 7,409,381 B1 | 8/2008 | Steel et al. |
| 7,412,078 B2 | 8/2008 | Kim |
| 7,418,736 B2 | 8/2008 | Ghanea-Hercock |
| 7,454,430 B1 | 11/2008 | Komissarchik et al. |
| 7,472,182 B1 | 12/2008 | Young et al. |
| 7,483,829 B2 | 1/2009 | Murakami et al. |
| 7,493,308 B1 | 2/2009 | Bair, Jr. et al. |
| 7,493,317 B2 | 2/2009 | Geva |
| 7,587,387 B2 | 9/2009 | Hogue |
| 7,644,076 B1 | 1/2010 | Ramesh et al. |
| 7,660,784 B1 * | 2/2010 | Virdy .................. G06F 17/30528 707/766 |
| 7,669,115 B2 | 2/2010 | Cho et al. |
| 7,672,971 B2 | 3/2010 | Betz et al. |
| 7,685,201 B2 | 3/2010 | Zeng et al. |
| 7,698,303 B2 | 4/2010 | Goodwin et al. |
| 7,716,225 B1 | 5/2010 | Dean et al. |
| 7,747,571 B2 | 6/2010 | Boggs |
| 7,756,823 B2 | 7/2010 | Young et al. |
| 7,797,282 B1 | 9/2010 | Kirshenbaum et al. |
| 7,885,918 B2 | 2/2011 | Statchuk |
| 7,917,154 B2 | 3/2011 | Fortescue et al. |
| 7,953,720 B1 | 5/2011 | Rohde et al. |
| 8,024,281 B2 | 9/2011 | Proctor et al. |
| 8,065,290 B2 | 11/2011 | Hogue |
| 8,086,690 B1 * | 12/2011 | Heymans et al. ............ 709/217 |
| 8,108,501 B2 | 1/2012 | Birnie et al. |
| 9,208,229 B2 | 12/2015 | Betz et al. |
| 2001/0021935 A1 | 9/2001 | Mills |
| 2002/0022956 A1 | 2/2002 | Ukrainczyk et al. |
| 2002/0038307 A1 | 3/2002 | Obradovic et al. |
| 2002/0042707 A1 | 4/2002 | Zhao et al. |
| 2002/0055954 A1 | 5/2002 | Breuer |
| 2002/0065814 A1 | 5/2002 | Okamoto et al. |
| 2002/0065815 A1 | 5/2002 | Layden |
| 2002/0065845 A1 | 5/2002 | Naito et al. |
| 2002/0073115 A1 | 6/2002 | Davis |
| 2002/0083039 A1 | 6/2002 | Ferrari et al. |
| 2002/0087567 A1 | 7/2002 | Spiegler et al. |
| 2002/0107861 A1 | 8/2002 | Clendinning et al. |
| 2002/0128818 A1 | 9/2002 | Ho et al. |
| 2002/0147738 A1 | 10/2002 | Reader |
| 2002/0154175 A1 | 10/2002 | Abello et al. |
| 2002/0169770 A1 | 11/2002 | Kim et al. |
| 2002/0173984 A1 | 11/2002 | Robertson et al. |
| 2002/0174099 A1 | 11/2002 | Ra et al. |
| 2002/0178448 A1 | 11/2002 | Te Kiefte et al. |
| 2002/0194172 A1 | 12/2002 | Schreiber |
| 2003/0005036 A1 | 1/2003 | Mitzenmacher |
| 2003/0018652 A1 | 3/2003 | Heckerman et al. |
| 2003/0058706 A1 | 3/2003 | Okamoto et al. |
| 2003/0069880 A1 | 4/2003 | Harrison et al. |
| 2003/0078902 A1 | 4/2003 | Leon et al. |
| 2003/0088607 A1 | 5/2003 | Ruellan et al. |
| 2003/0097357 A1 | 5/2003 | Ferrari et al. |
| 2003/0115485 A1 | 6/2003 | Milliken |
| 2003/0120373 A1 | 6/2003 | Eames |
| 2003/0120644 A1 | 6/2003 | Shirota |
| 2003/0120654 A1 | 6/2003 | Edlund et al. |
| 2003/0120659 A1 | 6/2003 | Sridhar |
| 2003/0120675 A1 | 6/2003 | Stauber et al. |
| 2003/0126102 A1 | 7/2003 | Borthwick |
| 2003/0126152 A1 | 7/2003 | Rajak |
| 2003/0149567 A1 | 8/2003 | Schmitz et al. |
| 2003/0149699 A1 | 8/2003 | Tsao |
| 2003/0154071 A1 | 8/2003 | Shreve |
| 2003/0158855 A1 | 8/2003 | Farnham et al. |
| 2003/0167163 A1 | 9/2003 | Glover et al. |
| 2003/0177110 A1 | 9/2003 | Okamoto et al. |
| 2003/0182310 A1 | 9/2003 | Charnock et al. |
| 2003/0195872 A1 | 10/2003 | Senn |
| 2003/0195877 A1 | 10/2003 | Ford et al. |
| 2003/0196052 A1 | 10/2003 | Bolik et al. |
| 2003/0204481 A1 | 10/2003 | Lau |
| 2003/0208354 A1 | 11/2003 | Lin et al. |
| 2003/0208665 A1 | 11/2003 | Peir et al. |
| 2003/0217052 A1 | 11/2003 | Rubenczyk et al. |
| 2004/0003067 A1 | 1/2004 | Ferrin |
| 2004/0015481 A1 | 1/2004 | Zinda |
| 2004/0024739 A1 | 2/2004 | Copperman et al. |
| 2004/0030731 A1 | 2/2004 | Iftode et al. |
| 2004/0049503 A1 | 3/2004 | Modha et al. |
| 2004/0059726 A1 | 3/2004 | Hunter et al. |
| 2004/0064447 A1 | 4/2004 | Simske et al. |
| 2004/0088292 A1 | 5/2004 | Dettinger et al. |
| 2004/0107125 A1 | 6/2004 | Guheen et al. |
| 2004/0122844 A1 | 6/2004 | Malloy et al. |
| 2004/0122846 A1 | 6/2004 | Chess et al. |
| 2004/0123240 A1 | 6/2004 | Gerstl et al. |
| 2004/0125137 A1 | 7/2004 | Stata et al. |
| 2004/0128624 A1 | 7/2004 | Arellano et al. |
| 2004/0143600 A1 | 7/2004 | Musgrove et al. |
| 2004/0153456 A1 | 8/2004 | Charnock et al. |
| 2004/0167870 A1 | 8/2004 | Wakefield et al. |
| 2004/0167907 A1 | 8/2004 | Wakefield et al. |
| 2004/0167909 A1 | 8/2004 | Wakefield et al. |
| 2004/0167911 A1 | 8/2004 | Wakefield et al. |
| 2004/0177015 A1 | 9/2004 | Galai et al. |
| 2004/0177080 A1 | 9/2004 | Doise et al. |
| 2004/0199923 A1 | 10/2004 | Russek |
| 2004/0220904 A1 | 11/2004 | Finlay et al. |
| 2004/0236655 A1 | 11/2004 | Seumniotales et al. |
| 2004/0243552 A1 | 12/2004 | Titemore et al. |
| 2004/0243614 A1 | 12/2004 | Boone et al. |
| 2004/0255237 A1 | 12/2004 | Tong |
| 2004/0260979 A1 | 12/2004 | Kumai |
| 2004/0267700 A1 | 12/2004 | Dumais et al. |
| 2004/0268237 A1 | 12/2004 | Jones et al. |
| 2005/0022009 A1 | 1/2005 | A Uilera et al. |
| 2005/0033803 A1 | 2/2005 | Vleet et al. |
| 2005/0039033 A1 | 2/2005 | Meyers et al. |
| 2005/0050016 A1 | 3/2005 | Stanoi et al. |
| 2005/0055327 A1 | 3/2005 | Agrawal et al. |
| 2005/0055365 A1 | 3/2005 | Ramakrishnan et al. |
| 2005/0057566 A1 | 3/2005 | Githens et al. |
| 2005/0060277 A1 | 3/2005 | Zlatanov et al. |
| 2005/0076012 A1 | 4/2005 | Manber et al. |
| 2005/0080613 A1 | 4/2005 | Colledge et al. |
| 2005/0083413 A1 | 4/2005 | Reed et al. |
| 2005/0086211 A1 | 4/2005 | Mayer |
| 2005/0086222 A1 | 4/2005 | Wang et al. |
| 2005/0086251 A1 | 4/2005 | Hatscher et al. |
| 2005/0086520 A1 | 4/2005 | Dharmapurikar et al. |
| 2005/0097150 A1 | 5/2005 | McKeon et al. |

(56) References Cited

U.S. PATENT DOCUMENTS

| | | |
|---|---|---|
| 2005/0108630 A1 | 5/2005 | Wasson et al. |
| 2005/0114324 A1 | 5/2005 | Mayer |
| 2005/0120004 A1 | 6/2005 | Stata et al. |
| 2005/0125311 A1 | 6/2005 | Chidiae et al. |
| 2005/0138007 A1 | 6/2005 | Amitay |
| 2005/0149576 A1 | 7/2005 | Marmaros et al. |
| 2005/0149851 A1 | 7/2005 | Mittal |
| 2005/0159851 A1 | 7/2005 | Engstrom et al. |
| 2005/0165781 A1 | 7/2005 | Kraft et al. |
| 2005/0187898 A1 | 8/2005 | Chazelle et al. |
| 2005/0187923 A1 | 8/2005 | Cipollone |
| 2005/0188217 A1 | 8/2005 | Ghanea-Hercock |
| 2005/0216464 A1 | 9/2005 | Toyama et al. |
| 2005/0219929 A1 | 10/2005 | Navas |
| 2005/0240615 A1 | 10/2005 | Barness et al. |
| 2005/0256825 A1 | 11/2005 | Dettinger et al. |
| 2005/0268212 A1 | 12/2005 | Dagel |
| 2005/0278314 A1 | 12/2005 | Buchheit |
| 2006/0004851 A1 | 1/2006 | Gold et al. |
| 2006/0020582 A1 | 1/2006 | Dettinger et al. |
| 2006/0036504 A1 | 2/2006 | Allocca et al. |
| 2006/0041375 A1* | 2/2006 | Witmer ............... G01C 15/00 701/532 |
| 2006/0041597 A1 | 2/2006 | Conrad et al. |
| 2006/0047691 A1 | 3/2006 | Humphreys et al. |
| 2006/0047838 A1 | 3/2006 | Chauhan |
| 2006/0053171 A1 | 3/2006 | Eldridge et al. |
| 2006/0053175 A1 | 3/2006 | Gardner et al. |
| 2006/0064411 A1 | 3/2006 | Gross et al. |
| 2006/0074824 A1 | 4/2006 | Li |
| 2006/0074910 A1 | 4/2006 | Yun et al. |
| 2006/0085386 A1 | 4/2006 | Thanu et al. |
| 2006/0085465 A1 | 4/2006 | Nod et al. |
| 2006/0112110 A1 | 5/2006 | Maymir-Ducharme et al. |
| 2006/0123046 A1 | 6/2006 | Doise et al. |
| 2006/0129843 A1 | 6/2006 | Srinivasa et al. |
| 2006/0136585 A1 | 6/2006 | May-Field et al. |
| 2006/0143227 A1 | 6/2006 | Helm et al. |
| 2006/0143603 A1 | 6/2006 | Kalthoff et al. |
| 2006/0149700 A1 | 7/2006 | Gladish et al. |
| 2006/0149800 A1 | 7/2006 | Egnor et al. |
| 2006/0152755 A1 | 7/2006 | Curtis et al. |
| 2006/0167991 A1 | 7/2006 | Heikes et al. |
| 2006/0173824 A1 | 8/2006 | Bensky et al. |
| 2006/0206508 A1 | 9/2006 | Colace et al. |
| 2006/0224582 A1 | 10/2006 | Hogue |
| 2006/0238919 A1 | 10/2006 | Bradley et al. |
| 2006/0242180 A1 | 10/2006 | Graf et al. |
| 2006/0248045 A1 | 11/2006 | Toledano et al. |
| 2006/0248456 A1 | 11/2006 | Bender et al. |
| 2006/0253418 A1 | 11/2006 | Charnock et al. |
| 2006/0253491 A1 | 11/2006 | Gokturk |
| 2006/0259462 A1 | 11/2006 | Timmons |
| 2006/0277169 A1 | 12/2006 | Lunt et al. |
| 2006/0288268 A1 | 12/2006 | Srinivasan et al. |
| 2006/0293879 A1 | 12/2006 | Zhao et al. |
| 2007/0005593 A1 | 1/2007 | Self et al. |
| 2007/0005639 A1 | 1/2007 | Gaussier et al. |
| 2007/0016890 A1 | 1/2007 | Brunner et al. |
| 2007/0022085 A1 | 1/2007 | Kulkarni |
| 2007/0038610 A1 | 2/2007 | Omoigui |
| 2007/0043708 A1 | 2/2007 | Tunstall-Pedoe |
| 2007/0055656 A1 | 3/2007 | Tunstall-Pedoe |
| 2007/0067108 A1 | 3/2007 | Buhler et al. |
| 2007/0073768 A1 | 3/2007 | Goradia |
| 2007/0094246 A1 | 4/2007 | Dill et al. |
| 2007/0100814 A1 | 5/2007 | Lee et al. |
| 2007/0106455 A1* | 5/2007 | Fuchs ................... G01C 21/32 701/438 |
| 2007/0130123 A1 | 6/2007 | Majumder |
| 2007/0143282 A1 | 6/2007 | Betz et al. |
| 2007/0143317 A1 | 6/2007 | Hogue et al. |
| 2007/0150800 A1 | 6/2007 | Betz et al. |
| 2007/0179965 A1 | 8/2007 | Hogue et al. |
| 2007/0198451 A1 | 8/2007 | Kehlenbeck et al. |
| 2007/0198480 A1 | 8/2007 | Hogue et al. |
| 2007/0198481 A1 | 8/2007 | Hogue et al. |
| 2007/0198503 A1 | 8/2007 | Hogue et al. |
| 2007/0198577 A1 | 8/2007 | Betz et al. |
| 2007/0198598 A1 | 8/2007 | Betz et al. |
| 2007/0198600 A1 | 8/2007 | Betz |
| 2007/0203867 A1 | 8/2007 | Hogue et al. |
| 2007/0203868 A1 | 8/2007 | Betz |
| 2007/0208683 A1* | 9/2007 | Geilich ............ G06F 17/30241 |
| 2007/0208773 A1 | 9/2007 | Tsao |
| 2007/0258642 A1* | 11/2007 | Thota ................ G06F 17/30241 382/173 |
| 2007/0271249 A1 | 11/2007 | Cragun et al. |
| 2007/0271268 A1 | 11/2007 | Fontoura et al. |
| 2007/0276845 A1* | 11/2007 | Geilich ............ G06F 17/30241 |
| 2008/0005064 A1 | 1/2008 | Sarukkai |
| 2008/0071739 A1 | 3/2008 | Kumar et al. |
| 2008/0097958 A1 | 4/2008 | Ntoulas et al. |
| 2008/0104019 A1 | 5/2008 | Nath |
| 2008/0189249 A1* | 8/2008 | Petakov ............. G06F 17/3087 |
| 2008/0209444 A1 | 8/2008 | Garrett et al. |
| 2008/0267504 A1 | 10/2008 | Schloter et al. |
| 2009/0006359 A1 | 1/2009 | Liao |
| 2009/0100048 A1 | 4/2009 | Hull et al. |
| 2009/0119255 A1 | 5/2009 | Frank et al. |
| 2014/0129538 A1 | 5/2014 | Hogue |
| 2014/0289177 A1 | 9/2014 | Laroco et al. |
| 2014/0372473 A1 | 12/2014 | Zhao et al. |
| 2014/0372478 A1 | 12/2014 | Zhao |
| 2014/0379743 A1 | 12/2014 | Laroco et al. |

FOREIGN PATENT DOCUMENTS

| | | |
|---|---|---|
| JP | 11-265400 A | 9/1999 |
| JP | 2002-157276 | 5/2002 |
| JP | 2002-540506 A | 11/2002 |
| JP | 2003-281173 A | 10/2003 |
| WO | WO 00/49526 A1 | 8/2000 |
| WO | WO 2001/27713 A2 | 4/2001 |
| WO | WO 04/114163 A2 | 12/2004 |
| WO | WO 06/104951 A1 | 10/2006 |
| WO | WO 2008/097051 A1 | 8/2008 |

OTHER PUBLICATIONS

Betz, Notice of Allowance, U.S. Appl. No. 11/394,414, dated Apr. 30, 2014, 12 pgs.

Betz, Notice of Allowance, U.S. Appl. No. 13/302,755, dated Jan. 6, 2014, 9 pgs.

Laroco, Notice of Allowance, U.S. Appl. No. 13/364,244, dated Feb. 7, 2014, 5 pgs.

Zhao, Notice of Allowance, U.S. Appl. No. 11/941,382, dated Apr. 14, 2014, 5 pgs.

Betz, Final Office Action, U.S. Appl. No. 11/394,552, dated Oct. 21, 2013, 22 pgs.

Betz, Notice of Allowance, U.S. Appl. No. 11/097,688, dated Nov. 19, 2013, 17 pgs.

Betz, Notice of Allowance, U.S. Appl. No. 13/302,755, dated Aug. 28, 2013, 6 pgs.

Hogue, Notice of Allowance, U.S. Appl. No. 13/549,361, dated Oct. 2, 2013, 9 pgs.

Hogue, Notice of Allowance, U.S. Appl. No. 13/549,361, dated Jun. 26, 2013, 8 pgs.

Hogue, Notice of Allowance, U.S. Appl. No. 13/603,354, dated Nov. 12, 2013, 9 pgs.

Hogue, Notice of Allowance, U.S. Appl. No. 13/603,354, dated Jun. 26, 2013, 8 pgs.

Laroco, Notice of Allowance, U.S. Appl. No. 13/364,244, dated Aug. 6, 2013, 6 pgs.

Laroco, Office Action, U.S. Appl. No. 13/364,244, dated Dec. 19, 2013, 5 pgs.

Shamsi, Final Office Action, U.S. Appl. No. 13/171,296, dated Nov. 4, 2013, 29 pgs.

Zhao, Office Action, U.S. Appl. No. 11/941,382, dated Sep. 27, 2013, 30 pgs.

(56) References Cited

OTHER PUBLICATIONS

Agichtein, Snowball estracting relations from large plain-text collections, Dec. 1999, 13 pgs.

Anagnostopoulos, Information fusion meta-search interface for precise photo acquisition on the web, Jun. 16-19, 2003, 7 pgs.

Andritsos: Information-theoretic tools for mining database structure from large data sets, ACM SIGMOD, Jun. 13-18, 2004, 12 pgs.

Anonymous, Wie erstelle ich bei StudiVZ eine Bilder-Verlinkung, Oct. 14, 2010, 10 pgs.

Betz, Examiner's Answer, U.S. Appl. No. 11/097,688, dated Jul. 8, 2010, 18 pgs.

Betz, Examiner's Answer, U.S. Appl. No. 11/394,414, dated Jan. 24, 2011, 31 pgs.

Betz, Notice of Allowance, U.S. Appl. No. 11/142,740, dated Apr. 16, 2009, 7 pgs.

Betz, Notice of Allowance, U.S. Appl. No. 11/142,765, dated Jul. 1, 2010, 14 pgs.

Betz, Notice of Allowance, U.S. Appl. No. 11/341,069, dated Sep. 8, 2008, 6 pgs.

Betz, Notice of Allowance, U.S. Appl. No. 12/939,981, dated Aug. 11, 2011, 7 pgs.

Betz, Notice of Allowance, U.S. Appl. No. 12/939,981, dated Apr. 26, 2011, 11 pgs.

Betz, Office Action, U.S. Appl. No. 11/142,740, dated Aug. 13, 2007, 12 pgs.

Betz, Office Action, U.S. Appl. No. 11/142,740, dated May 17, 2007, 12 pgs.

Betz, Office Action, U.S. Appl. No. 11/142,740, dated Jul. 23, 2008, 11 pgs.

Betz, Office Action, U.S. Appl. No. 11/142,740, dated Dec. 26, 2007, 12 pgs.

Betz, Office Action, U.S. Appl. No. 11/142,740, dated Jan. 27, 2009, 11 pgs.

Betz, Office Action, U.S. Appl. No. 11/142,740, dated Apr. 30, 2008, 14 pgs.

Betz, Office Action, U.S. Appl. No. 11/097,688, dated Mar. 18, 2009, 13 pgs.

Betz, Office Action, U.S. Appl. No. 11/097,688, dated Oct. 29, 2009, 11 pgs.

Betz, Office Action, U.S. Appl. No. 11/142,765, dated Jan. 8, 2010, 17 pgs.

Betz, Office Action, U.S. Appl. No. 11/142,765, dated May 9, 2008, 20 pgs.

Betz, Office Action, U.S. Appl. No. 11/142,765, dated Jan. 17, 2008, 16 pgs.

Betz, Office Action, U.S. Appl. No. 11/142,765, dated Oct. 17, 2007, 14 pgs.

Betz, Office Action, U.S. Appl. No. 11/142,765, dated Oct. 17, 2008, 17 pgs.

Betz, Office Action, U.S. Appl. No. 11/142,765, dated Jun. 18, 2007, 13 pgs.

Betz, Office Action, U.S. Appl. No. 11/142,765, dated Apr. 28, 2009, 16 pgs.

Betz, Office Action, U.S. Appl. No. 11/341,069, dated Apr. 1, 2008, 8 pgs.

Betz, Office Action, U.S. Appl. No. 11/394,414, dated Mar. 5, 2010, 24 pgs.

Betz, Office Action, U.S. Appl. No. 11/394,414, dated Sep. 15, 2009, 16 pgs.

Betz, Office Action, U.S. Appl. No. 11/394,552, dated Apr. 1, 2008, 14 pgs.

Betz, Office Action, U.S. Appl. No. 11/394,552, dated Aug. 4, 2010, 19 pgs.

Betz, Office Action, U.S. Appl. No. 11/394,552, dated Feb. 8, 2011, 22 pgs.

Betz, Office Action, U.S. Appl. No. 11/394,552, dated Jul. 8, 2011, 13 pgs.

Betz, Office Action, U.S. Appl. No. 11/394,552, dated Apr. 11, 2012, 15 pgs.

Betz, Office Action, U.S. Appl. No. 11/394,552, dated Nov. 12, 2008, 11 pgs.

Betz, Office Action, U.S. Appl. No. 11/394,552, dated Jan. 13, 2010, 15 pgs.

Betz, Office Action, U.S. Appl. No. 11/394,552, dated Mar. 13, 2009, 12 pgs.

Betz, Office Action, U.S. Appl. No. 11/394,552, dated Apr. 23, 2013, 21 pgs.

Betz, Office Action, U.S. Appl. No. 11/394,552, dated Sep. 24, 2012, 21 pgs.

Betz, Office Action, U.S. Appl. No. 12/939,981, dated Dec. 9, 2010, 12 pgs.

Betz, Office Action, U.S. Appl. No. 13/302,755, dated Mar. 25, 2012, 15 pgs.

Bharat, Personalized, Interactive News on the Web, May 5, 1997, 22 pgs.

Bloom Filter, Wikipedia, Feb. 13, 2005, 4 pgs.

Bloom, Space/Time Trade-Offs in Hash Coding with Allowable Errors, Jul. 1970, 5 pgs.

Brill et al:, An analysis of the ask MSR question-answering system, Proceedings of the Conference on Empirical Methods in Natural Language Processing (EMNLP) Jul. 2002, pp. 257-264.

Brin, Extracting patterns and relations from the world wide web, 1999, 12 pgs.

Brin, The anatomy of a large-scale hypertextual search engine, Apr. 14-18, 1998, 26 pgs.

Bunescu, R., et al: Using encyclopedia knowledge for named entity disambiguation, Department of Computer Science, University of Texas, retrieved from the internet, Dec. 28, 2006, 8 pgs.

CAO, Bloom Filters—The Math, Jul. 5, 1998, 6 pgs.

Castro, iPhoto's New Faces Feature Really Does Work, Feb. 17, 2009, 8 pgs.

Chang, C. et al: IEPAD: Information extraction based on pattern discovery, WWW10, AMC, May 1-5, 2001, pp. 681-688.

Chen: A scheme for inference problems using rough sets and entropy, Lecture notes in Computer Science, vol. 3642/2005, Regina, Canada Aug. 31-Sep. 3, 2005, 10 pgs.

Chesnais, The Fishwrap Personalized New System, Community Network, Jun. 20-22, 1995, 8 pgs.

Chu-Carroll, J. et al., A multi-strategy and multi-source approach to question answering, 2006, 8 pgs.

Clarke, FrontPage 2002 Tutorials—Adding Functionality to your Website with FrontPage 2002 part II—Navigation, Apr. 2002, 8 pgs.

Cover, Entropy, relative entropy and mutual information, Chapter 2 Elements of Information Theory, 1991, 13 pgs.

Cowie, MOQA: Meaning—Oriented Question Answering, 2004, 15 pgs.

Craswell, N., et al: Effective site finding using link anchor information,SIGIR'01, Sep. 9-12, 2001, 8 pgs.

Dean,J. et al.: MapReduce: Simplified data processing on large clusters, To appears in OSDI 2004, 13 pgs.

Dean: Using design recovery techniques to transform legacy systems, Proceedings IEEE International Conference, 2001, 10 pgs.

Dong, X. et al.: Reference reconciliation in complex information spaces, SIGACM-SIGMOD, 2005, 12 pgs.

Downey, D.: Learning text patterns for web information extraction and assessment, American Association for Artificial Intelligence, 2002, 6 pgs.

Etzioni: Unsupervised named-entity extraction from the web: an experimental study, Dept. of Computer Science and Engineering, University of Washington, Seattle, WA Feb. 28, 2005, 42 pgs.

Etzioni, O. et al., Web-scale information extraction in knowitall (preliminary results), WWW04, AMC, May 17-22, 2004, 11 pgs.

Freitag, D. et al.: Boosted wrapped induction, American Association of Artificial Intelligence, 2000, 7 pgs.

Gao, X., et al.: Learning information extraction patterns from tabular web pages without manual labelling, Proceedings of the IEEE/WIC Int'l Conf. on Web Intelligence (WI'03), Oct. 13-17, 2009, 4 pgs.

Gigablast: Web/Directory, http://www.gigablast.com/?c=dmz3 printed Aug. 24, 2010, 1 pg.

Gilster, P: Get fast answers easily, The News Observer, May 14, 2003 2 pgs.

(56) References Cited

OTHER PUBLICATIONS

Google, ISR/WO, PCT/US2006/007639, dated Sep. 13, 2006, 5 pgs.
Google, ISR/WO, PCT/US2006/010965, dated Jul. 5, 2006, 4 pgs.
Google, ISR/WO, PCT/US2006/019807, dated Dec. 18, 2006, 4 pgs.
Google, ISR/WO, PCT/US2007/061156, dated Feb. 11, 2008, 5 pgs.
Google, Inc., ISR/WO, PCT/US2007/061157, dated Feb. 15, 2008, 10 pgs.
Google, Inc., ISR/WO, PCT/US2007/061158, dated Feb. 28, 2008, 7 pgs.
Google, Inc., ISR/WO, PCT/US2010/044603, dated Nov. 17, 2010, 11 pgs.
Google, Inc., ISR/WO, PCT/US2010/044604, dated Oct. 6, 2010, 10 pgs.
Google, Office Action, CA 2,610,208, dated Sep. 21, 2011, 3 pgs.
Google, Inc., Office Action, CA 2603085, dated Sep. 18, 2012, 2 pgs.
Google, Inc., Office Action, EP 06784449.8, dated Mar. 26, 2012, 7 pgs.
Google, Office Action, JP 2008-504204, dated Oct. 12, 2011, 3 pgs.
Gray, R.M.: Entropy and information theory, Springer-Verlag, NY, NY, 1990, 30 pgs.
Guha, R. et al., Disambiguating people in search, WWW04, AMC, May 17-20, 2004, 9 pgs.
Guha,R, Object co-identification on the semantic web, WWW04, AMC, May 17-22, 2004, 9 pgs.
Haveliwala, T.H.: Topic-sensitive pagerank, Proceedings of the 11th Int'l World Wide Web Conference, Honolulu, Hawaii, May 7-11, 2002, 23 pgs.
Hogue, Examiner's Answer, U.S. Appl. No. 11/142,748, dated Oct. 3, 2011, 23 pgs.
Hogue, Notice of Allowance, U.S. Appl. No. 11/097,689, dated Apr. 30, 2009, 8 pgs.
Hogue, Notice of Allowance, U.S. Appl. No. 11/356,837, dated Jan. 6, 2012, 12 pgs.
Hogue, Notice of Allowance, U.S. Appl. No. 11/356,837, dated Apr. 27, 2012, 7 pgs.
Hogue, Notice of Allowance, U.S. Appl. No. 12/546,578, dated Jan. 6, 2011, 8 pgs.
Hogue, Notice of Allowance, U.S. Appl. No. 12/546,578, dated Jul. 12, 2011, 10 pgs.
Hogue, Notice of Allowance, U.S. Appl. No. 13/206,457, dated Mar. 14, 2012, 9 pgs.
Hogue, Office Action, U.S. Appl. No. 11/097,689, dated Oct. 3, 2008, 13 pgs.
Hogue, Office Action, U.S. Appl. No. 11/097,689, dated Apr. 9, 2008, 11 pgs.
Hogue, Office Action, U.S. Appl. No. 11/097,689, dated Jun. 21, 2007, 9 pgs.
Hogue, Office Action, U.S. Appl. No. 11/097,689, dated Nov. 27, 2007, 10 pgs.
Hogue, Office Action, U.S. Appl. No. 11/142,748, dated Dec. 7, 2007, 13 pgs.
Hogue, Office Action, U.S. Appl. No. 11/142,748, dated Jul. 13, 2010, 12 pgs.
Hogue, Office Action, U.S. Appl. No. 11/142,748, dated Aug. 17, 2009, 14 pgs.
Hogue, Office Action, U.S. Appl. No. 11/142,748, dated Nov. 17, 2010, 14 pgs.
Hogue, Office Action, U.S. Appl. No. 11/142,748, dated May 18, 2007, 9 pgs.
Hogue, Office Action, U.S. Appl. No. 11/142,748, dated Jul. 22, 2008, 18 pgs.
Hogue, Office Action, U.S. Appl. No. 11/142,748, dated Aug. 23, 2007, 13 pgs.
Hogue, Office Action, U.S. Appl. No. 11/142,748, dated Jan. 27, 2009, 17 pgs.
Hogue, Office Action, U.S. Appl. No. 11/356,837, dated Jun. 3, 2011, 18 pgs.
Hogue, Office Action, U.S. Appl. No. 11/356,837, dated Aug. 4, 2010, 20 pgs.
Hogue, Office Action, U.S. Appl. No. 11/356,837, dated Feb. 8, 2011, 14 pgs.
Hogue, Office Action, U.S. Appl. No. 11/356,837, dated May 11, 2009, 18 pgs.
Hogue, Office Action, U.S. Appl. No. 11/356,837, dated Feb. 19, 2010, 20 pgs.
Ifogue, Office Action, U.S. Appl. No. 11/356,837, dated Mar. 21, 2008, 15 pgs.
Hogue, Office Action, U.S. Appl. No. 11/356,837, dated Oct. 27, 2009, 20 pgs.
Hogue, Office Action, U.S. Appl. No. 11/356,837, dated Sep. 30, 2008, 20 pgs.
Hogue, Office Action, U.S. Appl. No. 11/399,857, dated Mar. 1, 2012, 25 pgs.
Hogue, Office Action, U.S. Appl. No. 11/399,857, dated Mar. 3, 2011, 15 pgs.
Hogue, Office Action, U.S. Appl. No. 11/399,857, dated Jan. 5, 2009, 21 pgs.
Hogue, Office Action, U.S. Appl. No. 11/399,857, dated Jun. 8, 2009, 14 pgs.
Hogue, Office Action, U.S. Appl. No. 11/399,857, dated Sep. 13, 2010, 13 pgs.
Hogue, Office Action, U.S. Appl. No. 11/399,857, dated Jun. 24, 2011, 14 pgs.
Hogue, Office Action, U.S. Appl. No. 11/399,857, dated Dec. 28, 2009, 11 pgs.
Hogue, Office Action, U.S. Appl. No. 11/399,857, dated Mar. 31, 2008, 23 pgs.
Hogue, Office Action, U.S. Appl. No. 12/546,578, dated Aug. 4, 2010, 10 pgs.
Hogue, Office Action, U.S. Appl. No. 13/206,457, dated Oct. 28, 2011, 6 pgs.
Hogue, Office Action, U.S. Appl. No. 13/549,361, dated Oct. 4, 2012, 18 pgs.
Hogue, Office Action, U.S. Appl. No. 13/549,361, dated Mar. 6, 2013, 13 pgs.
Hogue, Office Action, U.S. Appl. No. 13/603,354, dated Jan. 9, 2013, 5 pgs.
Hogue, Tree pattern inference and matching for wrapper induction on the world wide web, Jun. 2004, 106 pgs.
Hsu, Finite-state transducers for semi-structured text mining, 1999.
Ilyas, Rank-aware query optimization, Jun. 13-18, 2004, 12 pgs.
Information entropy, Wikipedia, May 3, 2006, 9 pgs.
Information theory, Wikipedia, May 3, 2006, 12 pgs.
Jeh, Scaling personalized web search, May 20-24, 2003, 24 pgs.
Ji, Re-ranking algorithms for name tagging. Jun. 2006, 8 pgs.
Jones: Bootstrapping for text learning tasks, 1999, 12 pgs.
Kamba, An Interactive, Personalized, Newspaper on the Web, 1993, 12 pgs.
Koeller: Approximate matching of textual domain attributes for information source integration, Jun. 17, 2005, 10 pgs.
Kolodner: Indexing and retrieval strategies for natural language fact retrieval, ACM Trans. Database System 8.3, Sep. 1983, 31 pgs.
Kosala, R.: Web mining research, A Survey, SIGKDD Explorations, vol. 2, Issue 1, p. 1 Jul. 2000, 15 pgs.
Kosseim,L., Answer formulation for question-answering, Oct. 1, 2007, 11 pgs.
Laroco, Notice of Allowance, U.S. Appl. No. 11/551,657, dated May 13, 2011, 8 pgs.
Laroco, Notice of Allowance, U.S. Appl. No. 11/551,657, dated Sep. 28, 2011, 8 pgs.
Laroco, Office Action, U.S. Appl. No. 11/551,657, dated Aug. 1, 2008, 15 pgs.
Laroco, Office Action, U.S. Appl. No. 11/551,657, dated Aug. 13, 2009, 16 pgs.
Laroco, Office Action, U.S. Appl. No. 11/551,657, dated Nov. 17, 2010, 20 pgs.
Laroco, Office Action, U.S. Appl. No. 11/551,657, dated Feb. 24, 2010, 17 pgs.
Laroco, Office Action, U.S. Appl. No. 11/551,657, dated Jan. 28, 2009, 17 pgs.

(56) References Cited

OTHER PUBLICATIONS

Laroco, Office Action, U.S. Appl. No. 13/364,244, dated Jan. 30, 2013, 8 pgs.
Lin, J. et al.: Question answering from the web using knowledge annotation and knowledge mining techniques, CIKM'03, Nov. 3-8, 2003, 8 pgs.
Liu, B., Mining data records in web pages, Conference 00, ACM, 2000, 10 pgs.
MacKay, D.J.C.: Information theory, inference and learning algorithms, Cambridge University Press, 2003, pp. 22-33, 138-140.
Mann, G. et al.: Unsupervised personal name disambiguation, Proceedings of the Seventy Conference on Natural Language Learning at HLT_NAACL, 2003, 8 pgs.
McCallum, et al., Object consolidation by graph partitioning with a conditionally-trained distance metric, SIGKDD 03, ACM, Aug. 24-27, 2003, 6 pgs.
Merriam Webster Dictionary defines "normalize" as "to make conform to or reduce to a norm or standard", 1865, 2 pgs.
Merriam Webster Dictionary defines "value" as "A numerical quantity that is assigned or is determined by . . . ", 1300, 2 pgs.
Microsoft Computer Dictionary defines "normalize" as "adjust number within specific range", May 1, 2002, 4 pgs.
Microsoft Computer Dictionary defines "quantity" as a "number", May 1, 2002, 4 pgs.
Microsoft Computer Dictionary defines "value" as a "quantity", May 1, 2002, 4 pgs.
Mihalcea, R. et al., PageRank on semantic networks with application to word sense disambiguation, Aug. 23-27, 2004, 7 pgs.
Mihalcea, R. et al., TextRank: bringing order into texts, Jul. 2004, 8 pgs.
Nadeau: Unsupervised named-entity recognition: generating gazetteers and resolving ambiguity, Inst. for Information Technology, National Research Council Canada, Gatineau and Ottawa, Canada, Aug. 1, 2006, 12 pgs.
Nyberg, E. et al.: The JAVELIN question-answering system at TREC 2003: A Multi-Strategy Approach with Dynamic Planning, Nov. 18-21, 2003, 9 pgs.
Ogden,W. et al.: Improving cross-language text retrieval with human interactions, Proceedings of the 33rd Hawaii International Conference on System Science, IEEE, Jan. 2000, 9 pgs.
Page,L., et al: The pagerank citation ranking: bringing order to the web, Stanford Digital Libraries Working Paper, 1998, 17 pgs.
Pawson D.: Sorting and grouping, www.dpawson.uk.xsl/sect2/N6280.html Feb. 7, 2004, 19 pgs.
Plaisant, C. et al.: Interface and data architecture for query preview in networked information systems, ACM Transaction on Information Systems, vol. 17, Issue 3, Jul. 1999, 28 pgs.
Prager, J. et al., IBM's piquant in TREC2003, Nov. 18-21, 2003, 10 pgs.
Prager, H. et al., Question answering using constraint satisfaction: QA-by-dossier-with-constraints, 2004, 8 pgs.
Ramakrishnan, G. et al., Is question answering an acquired skill?, WWW04, ACM, May 17-22, 2004, 10 pgs.
Richardson, M. et al.: Beyond page rank: machine learning for static ranking, International World Wide Web Conference Committee May 23, 2006, 9 pgs.
Richardson, M. et al.: The intelligent surfer: probabilistic combination of link and content information in page rank, Advance in Neural Information Processing System, vol. 14, MIT Press, Cambridge, MA, 2002, 8 pgs.
Riloff, E., et al: Learning dictionaries for information extraction by multi-level bootstrapping, American Association for Artificial Intelligence, 1999, 6 pgs.
Rohde, Notice of Allowance, U.S. Appl. No. 11/097,690, dated Dec. 23, 2010, 8 pgs.
Rohde, Office Action, U.S. Appl. No. 11/097,690, dated May 1, 2008, 21 pgs.
Rohde, Office Action, U.S. Appl. No. 11/097,690, dated Jun. 9, 2010, 11 pgs.
Rohde, Office Action, U.S. Appl. No. 11/097,690, dated Oct. 15, 2008, 22 pgs.
Rohde, Office Action, U.S. Appl. No. 11/097,690, dated Aug. 27, 2009, 13 pgs.
Rohde, Office Action, U.S. Appl. No. 11/097,690, dated Apr. 28, 2009, 11 pgs.
Rohde, Office Action, U.S. Appl. No. 11/097,690, dated Sep. 28, 2007, 17 pgs.
Shamsi, Notice of Allowance, U.S. Appl. No. 11/781,891, dated Oct. 25, 2010, 7 pgs.
Shamsi, Notice of Allowance, U.S. Appl. No. 11/781,891, dated May 27, 2010, 6 pgs.
Shamsi, Office Action, U.S. Appl. No. 11/781,891, dated Nov. 16, 2009, 10 pgs.
Shamsi, Office Action, U.S. Appl. No. 13/171,296, dated Apr. 3, 2013, 7 pgs.
Shannon, C.E. et al.: A mathematical theory of communication, The Bell System Technical Journal, vol. 27, Jul., Oct. 1948, 55 pgs.
Sun Microsystems: Attribute Names, Online: http://java.sun.com/products/jndi/tutorial/basics/directory/attrnames.html, Feb. 17, 2004, 2 pgs.
The MathWorks, Using Matlab Graphics, Dec. 1996, 52 pgs.
Thompson, Freshman Publishing Experiment Offers Made-to-Order Newspapers, 1994, 4 pgs.
Vespe, Notice of Allowance, U.S. Appl. No. 11/686,217, dated Aug. 27, 2012, 16 pgs.
Vespe, Notice of Allowance, U.S. Appl. No. 11/745,605, dated Jun. 13, 2011, 9 pgs.
Vespe, Notice of Allowance, U.S. Appl. No. 11/745,605, dated Sep. 22, 2011, 9 pgs.
Vespe, Notice of Allowance, U.S. Appl. No. 11/745,605, dated Mar. 28, 2012, 10 pgs.
Vespe, Office Action, U.S. Appl. No. 11/686,217, dated Sep. 10, 2010, 14 pgs.
Vespe, Office Action, U.S. Appl. No. 11/686,217, dated Jan. 26, 2012, 12 pgs.
Vespe, Office Action, U.S. Appl. No. 11/686,217, dated Mar. 26, 2010, 13 pgs.
Vespe, Office Action, U.S. Appl. No. 11/745,605, dated Apr. 8, 2010, 15 pgs.
Vespe, Office Action, U.S. Appl. No. 11/745,605, dated Jul. 30, 2009, 17 pgs.
Wang, Y. et al.: C4-2: Combining link and contents in clustering web search results to improve information interpretation, The University of Tokyo, 2002, 9 pgs.
Wirzenius, Lars,: C preprocessor trick for implementing similar data types, Jan. 17, 2000, 9 pgs.
Zhao, et al: Corroborate and learn facts from the web, KDD'07, Aug. 12-15, 2007, 9 pgs.
Zhao, Notice of Allowance, U.S. Appl. No. 11/394,610, dated May 11, 2009, 15 pgs.
Zhao, Office Action, U.S. Appl. No. 11/142,853, dated Oct. 2, 2009, 10 pgs.
Zhao, Office Action, U.S. Appl. No. 11/142,853, dated Sep. 5, 2008, 9 pgs.
Zhao, Office Action, U.S. Appl. No. 11/142,853, dated Mar. 17, 2009, 9 pgs.
Zhao, Office Action, U.S. Appl. No. 11/142,853, dated Jan. 25, 2008, 7 pgs.
Zhao, Office Action, U.S. Appl. No. 11/394,610, dated Apr. 1, 2008, 18 pgs.
Zhao, Office Action, U.S. Appl. No. 11/394,610, dated Nov. 13, 2008, 18 pgs.
Zhao, Office Action, U.S. Appl. No. 11/941,382, dated Sep. 8, 2011, 28 pgs.
Zhao, Office Action, U.S. Appl. No. 11/941,382, dated Aug. 12, 2010, 23 pgs.
Zhao, Office Action, U.S. Appl. No. 11/941,382, dated May 24, 2012, 26 pgs.
Zhao, Office Action, U.S. Appl. No. 11/941,382, dated Nov. 26, 2012, 24 pgs.
Zhao, Office Action, U.S. Appl. No. 11/941,382, dated Jan. 27, 2011, 24 pgs.

(56) References Cited

OTHER PUBLICATIONS

Zhao, Office Action, U.S. Appl. No. 11/941,382, dated Dec. 29, 2009, 25 pgs.
Lam, et al, "Querying Web Data—The WebQA Approach", Proceedings of the 3rd International Conference on Web Information Systems Engineering, 2002, pp. 139-148.
Mahlin, et al, "DOrAM: Real Answers to Real Questions", AAMA'02, 2002, pp. 792-793.
Pradhan, et al, "Building a Foundation System for Producing Short Answers to Factual Questions", Proceedings of the Eleventh Text Retrieval Conference (TREC 2002), NIST Special Publication SP 500-251, 2003, 10 pages.
Kwok, et al., "Scaling question answering to the web", ACM Transactions on Information Systems, vol. 19, No. 3, Jul. 2001, pp. 242-262.
Katz, et al., "Omnibase: Uniform Access to Heterogeneous Data for Question Answering", Natural Language Processing and Information Systems, vol. 2553 of the series Lecture Notes in Computer Science, Springer Berlin Heidelberg, 2002, pp. 230-234.
Lopez, et al., "AquaLog: An Ontology-Portable Question Answering System for the Semantic Web", The Semantic Web: Research and Applications, vol. 3532 of the series Lecture Notes in Computer Science, Springer Berlin Heidelberg, 2005, pp. 546-562.
Final Office Action received for U.S. Appl. No. 14/151,721, dated Feb. 25, 2016, 14 pages.
Gilster, "Get fast answers, easily", Newsobserver.com, retrieved from http://web.archive.org/web/20050308154148/http://newsobserver.com/business/technology/gilster/2003/story/1258931p-7372446c.html, May 14, 2003, 2 pages.

\* cited by examiner

Example Format of Facts in Repository (each fact is associated with an object ID)

Example Facts in Repository (each fact is associated with an object ID)

Example Object
Reference Table**

Example Format of Facts in Repository (each fact is associated with an object ID)

Example Objects

California:

CA, Cali., Calif., California, Golden State

New York:

NY, New York, Empire State

FIG. 6 (a)

California:

Latitude:

32°30'N to 42°N

Longitude:

114°8'W to 124°24'W

New York:

Latitude:

40°29'40"N to 45°0'42"N

Longitude:

DETERMINING GEOGRAPHIC LOCATIONS FOR PLACE NAMES IN A FACT REPOSITORY

RELATED APPLICATIONS

This application is a continuation of and claims priority to U.S. patent application Ser. No. 11/686,217, filed Mar. 14, 2007, entitled "Geopoint Janitor," which is incorporated herein by reference in its entirety.

TECHNICAL FIELD

The disclosed embodiments relate generally to analyzing place names extracted in a collection of documents. More particularly, the disclosed embodiments relate to analyzing place names that have been extracted from documents such as web pages.

BACKGROUND

Place names extracted from different sources have a variety of formats and may contain typographical errors, omissions, or unclear language. There may also be ambiguity as to whether a word represents a place name and whether different place names represent the same location. It is useful to have a way to identify the precise location of a place name.

SUMMARY

In accordance with one aspect of the disclosed implementations, a computer-implemented method and computer program product process a text string within an object stored in memory to identify a first potential place name. The method and computer program product determine whether geographic location coordinates are known for the first potential place name. Further, the method and computer program product identify the first potential place name as a place name and tag the identified place name associated with an object in the memory with its geographic location coordinates, when the geographic location coordinates for the first identified place name are known.

In one implementation, a system includes a potential place name identifier to determine if a text string contains a first potential place name. The system also includes a coordinate determiner to determine whether geographic location coordinates are known for the first potential place name. In addition, the system includes a place name identifier to determine whether the first potential place name is a place name and a coordinate assignor to tag the first identified place name associated with an object in the memory with its geographic location coordinates, when the geographic location coordinates for the first identified place name are known.

BRIEF DESCRIPTION OF THE DRAWINGS

FIG. 6(a) is an example illustrating a method for determining whether a text string corresponds to a potential place name, according to some implementations.

FIG. 6(b) is an example illustrating a method for determining whether there are geographic location coordinates known for a potential place name, in accordance with some implementations.

DESCRIPTION OF EMBODIMENTS

Embodiments of the present invention are now described with reference to the figures where like reference numbers indicate identical or functionally similar elements.

Figure 1:
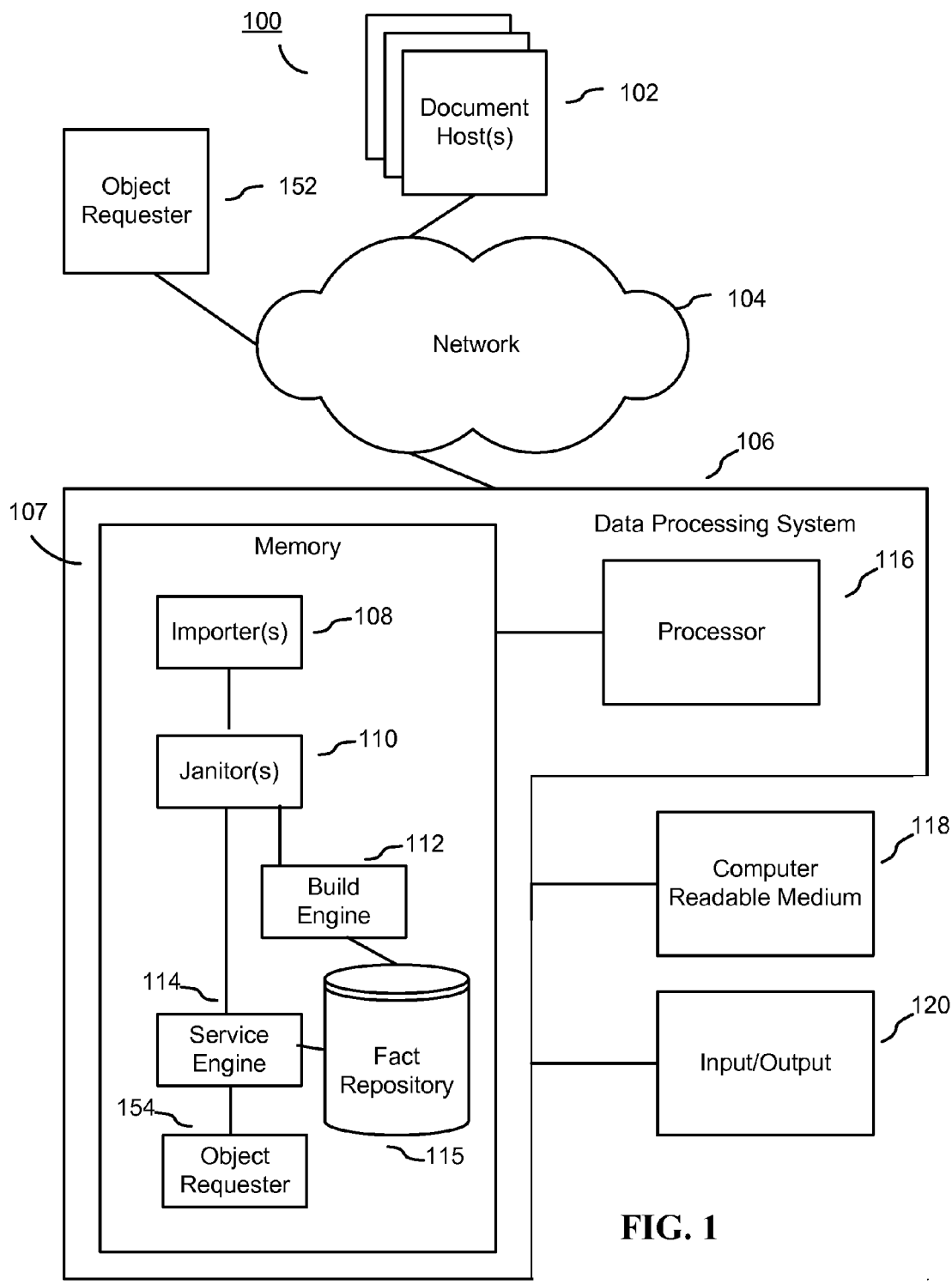
FIG. 1 shows a network, in accordance with some implementations.

FIG. 1 shows a system architecture 100, in accordance with some implementations. FIG. 1 shows components used to add facts into, and retrieve facts from a repository 115. The system architecture 100 includes a network 104, through which any text string of document hosts 102 communicate with a data processing system 106, along with any text string of object requesters 152, 154.

Document hosts 102 store documents and provide access to documents. A document is comprised of any machine-readable data including any combination of text, graphics, multimedia content, etc. One example of a document is a book (e.g., fiction or nonfiction) in machine-readable form. A document may be encoded in a markup language, such as Hypertext Markup Language (HTML), e.g., a web page, in an interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "December 2, 1981." Birthday and Date of Birth might both be rewritten as Birthdate by one janitor and then another janitor might notice that 12/2/1981 and December 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any text string of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(*a*)-2(*d*).

It should be appreciated that in practice at least some of the components of the data processing system 106 will be distributed over multiple computers, communicating over a network. For example, repository 115 may be deployed over multiple servers. As another example, the janitors 110 may be located on any text string of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

FIG. 2(*a*) shows an example format of a data structure for facts within repository 115, according to some implementations. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "February 22, 1732." In one embodiment, all facts are stored as alphanumeric characters since they are extracted from web pages. In another embodiment, facts also can store binary data values.

Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

FIG. 2(*b*) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42 nd President of the United States from 1993 to 2001." In the illustrated embodiment, each fact has one attribute and one value. The text string of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, text strings, perhaps even tables of figures. This content can be formatted, for example, in a markup language. For example, a fact having an attribute "original html" might have a value of the original html text taken from the source web page.

Also, while the illustration of FIG. 2(*b*) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(*c*) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(*b*) and 2(*c*) illustrate the object reference table 210 with explicit coding of object and fact IDs, the table also may contain just the ID values themselves in column or pair-wise arrangements.

FIG. 2(*d*) shows an example of a data structure for facts within repository 115, according to some implementations showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(*d*) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2A:
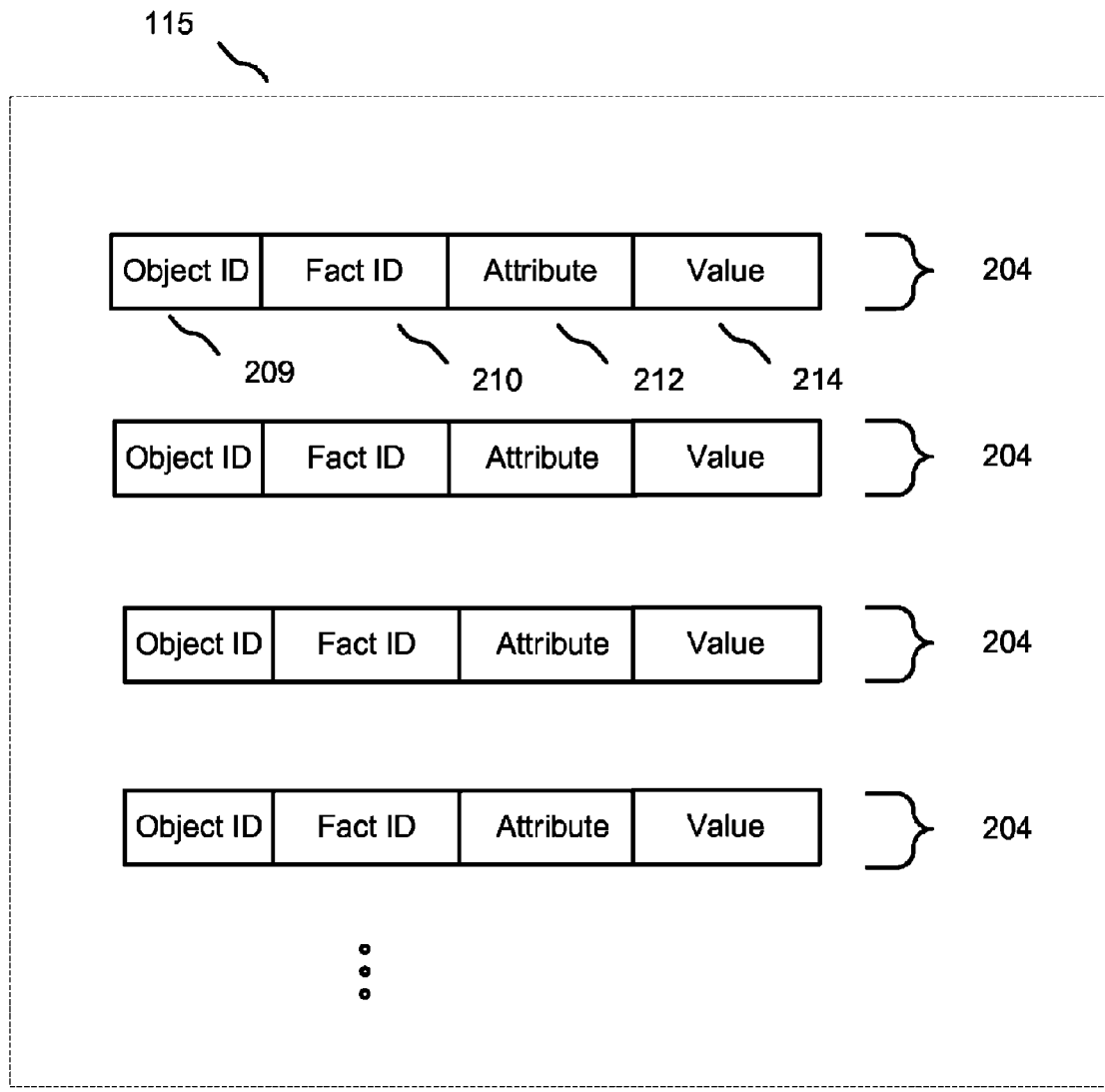
FIGS. 2(a)-2(d) are block diagrams illustrating a data structure for facts within a repository of FIG. 1 in accordance with some implementations.
Figure 2B:
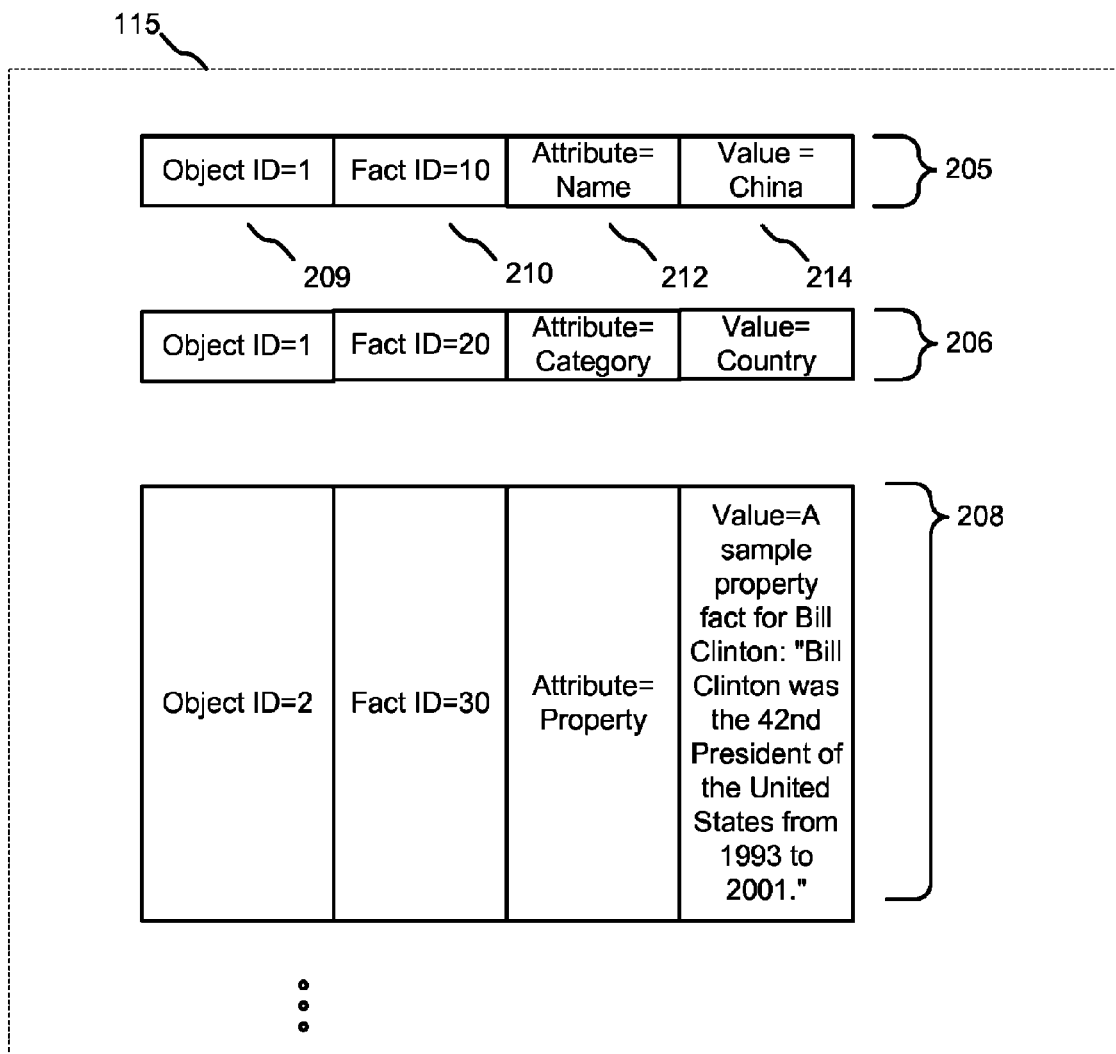
Figure 2C:
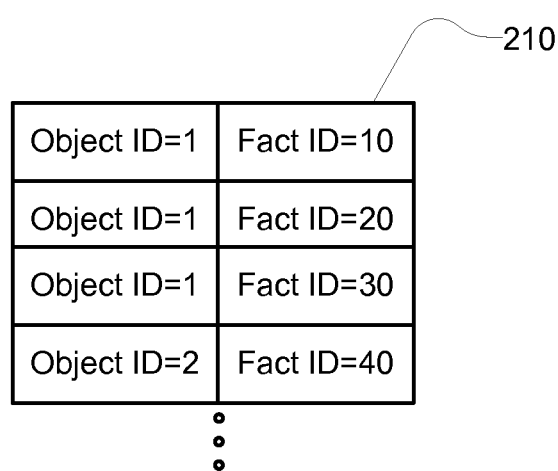
Figure 2D:
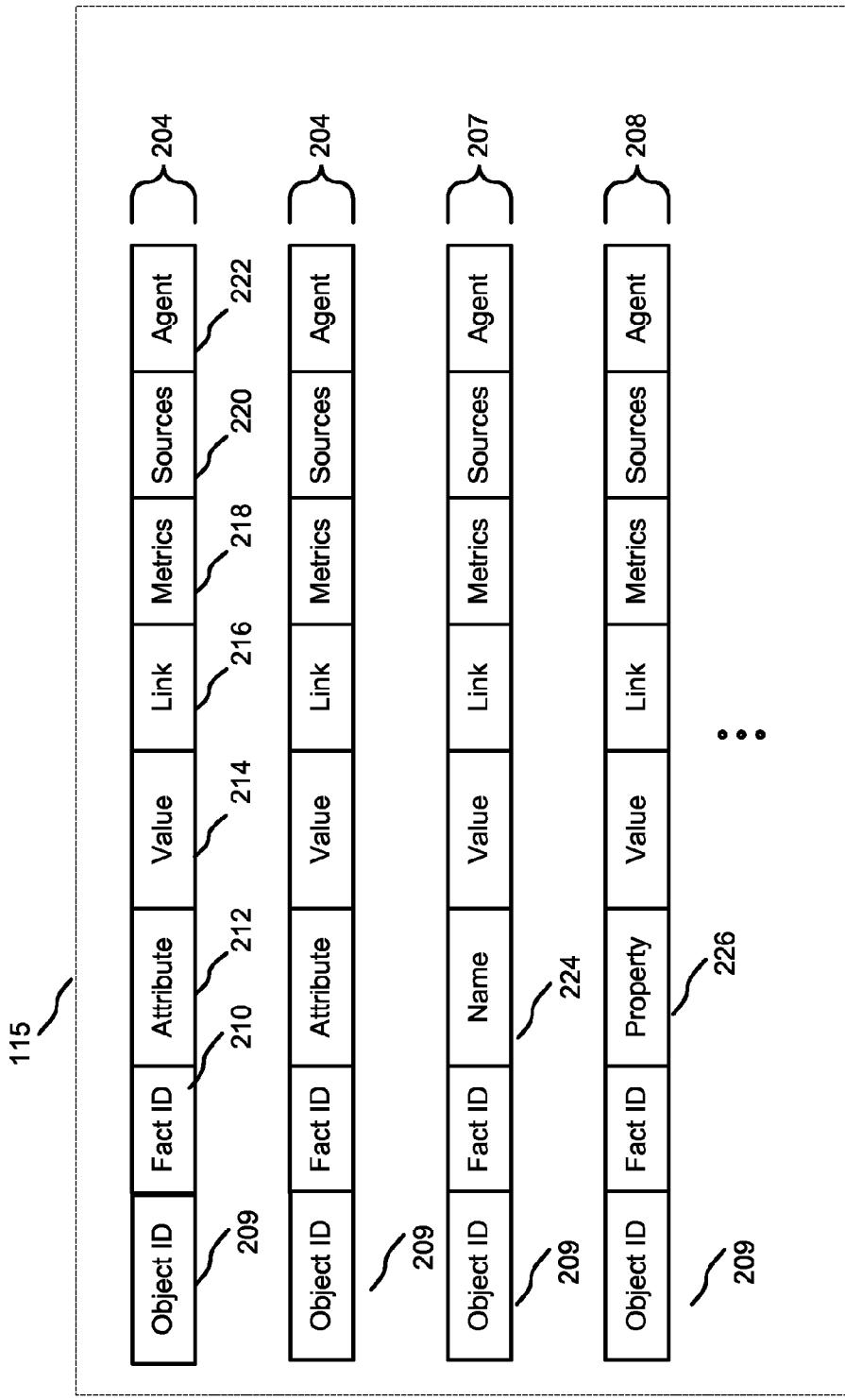
Figure 2E:
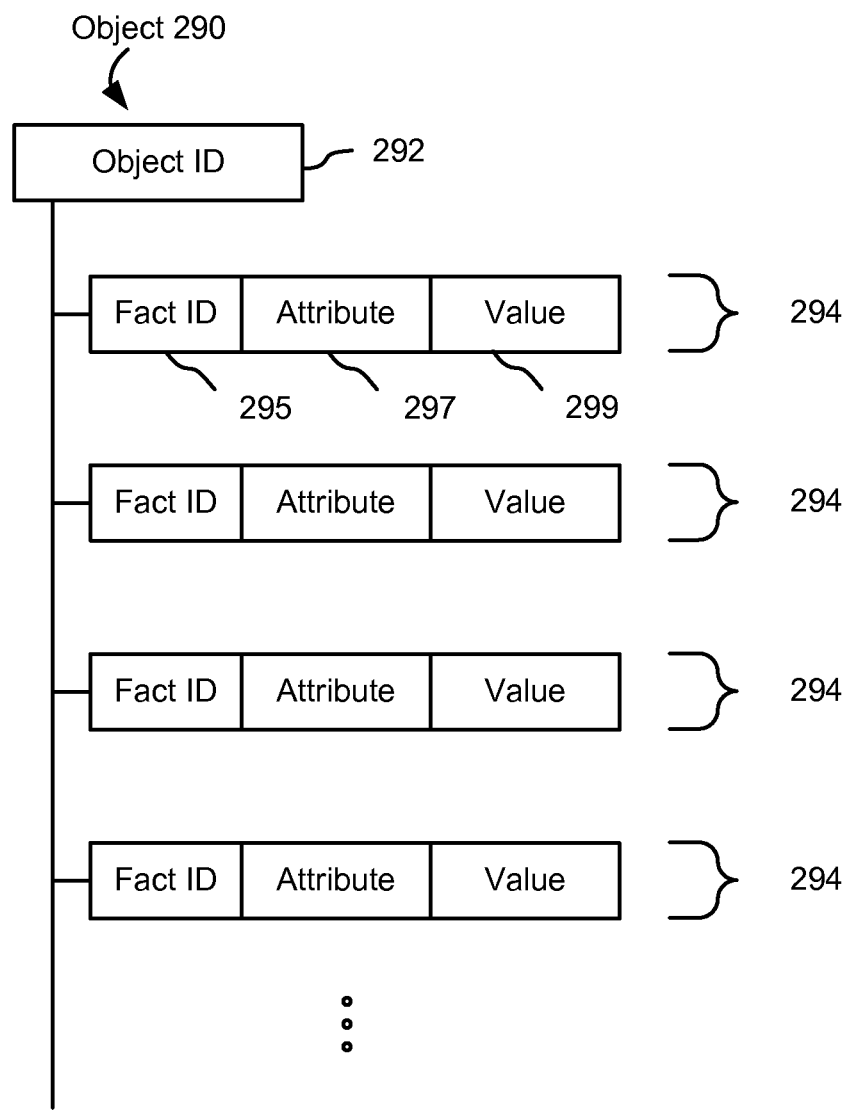
FIG. 2(e) is a block diagram illustrating an alternate data structure for facts and objects in accordance with some implementations.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3:
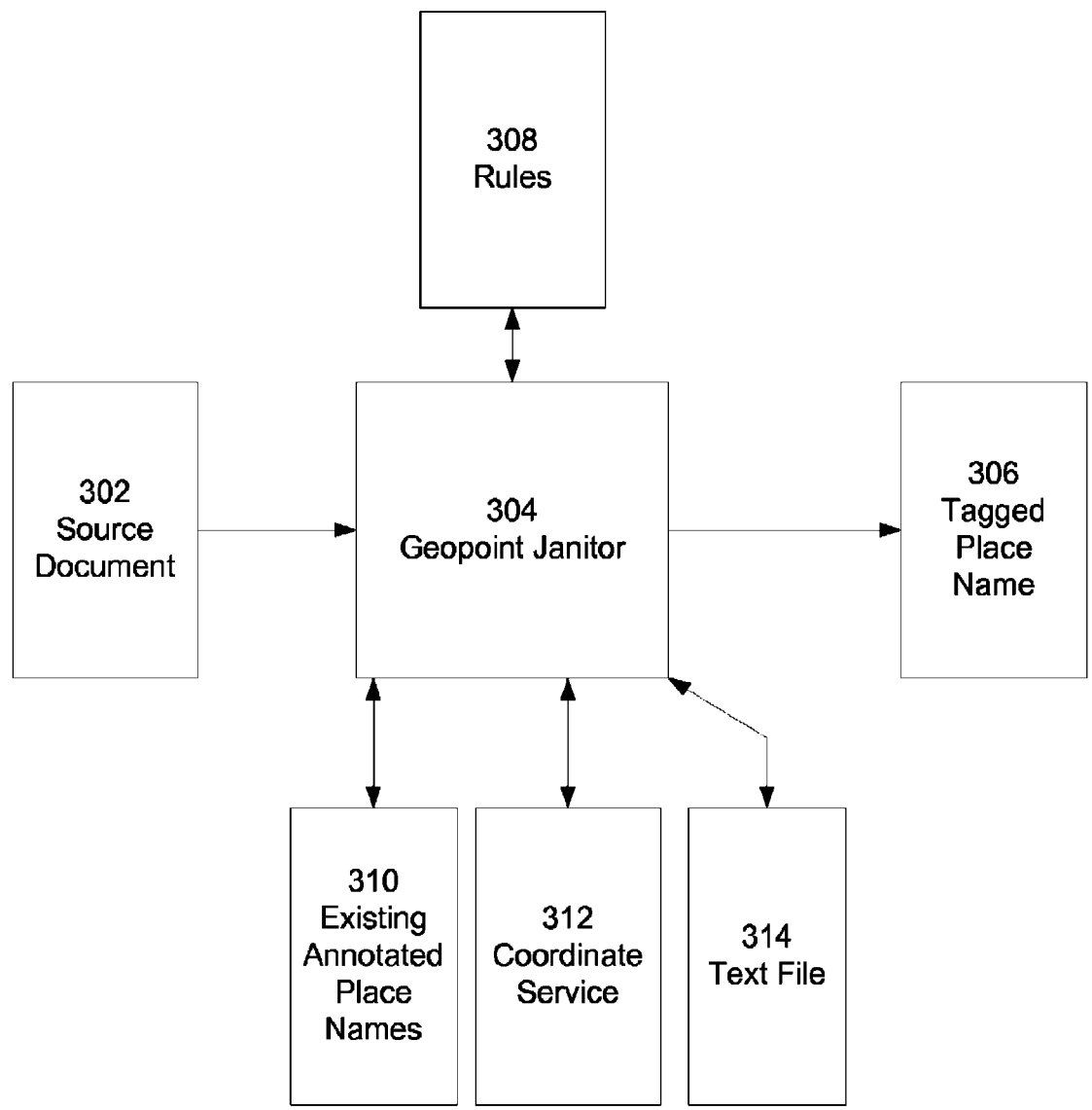
FIG. 3 is a data flow diagram illustrating a geopoint janitor, according to some implementations.

FIG. 3 is a data flow diagram illustrating a geopoint janitor 304, according to some implementations. A source document 302 may be a document, such as a website. The source document 302 may also be a fact that has been extracted previously from a document and may be stored within a computer memory. For the purposes of illustration, a single source document 302 is shown in FIG. 3. In another embodiment, a plurality of source documents 302 may be used by geopoint janitor 304.

According to one embodiment, geopoint janitor 304 determines whether at least one text string listed within source document 302 is a potential place name through the application of various rules 308, as described below with reference to FIG. 4. Geopoint janitor 304 determines whether there are known geographic location coordinates associated with the potential place name through examining a text file 314, existing annotated place names 310 and/or through a coordinate lookup service 312, according to one embodiment. If such known coordinates exist, geopoint janitor 304 tags the place name with the coordinates 306. The process of determining whether geographic location coordinates are known for the potential place name, and tagging the place name if the coordinates are known, is described below with reference to FIGS. 4-8(b).

Figure 4:
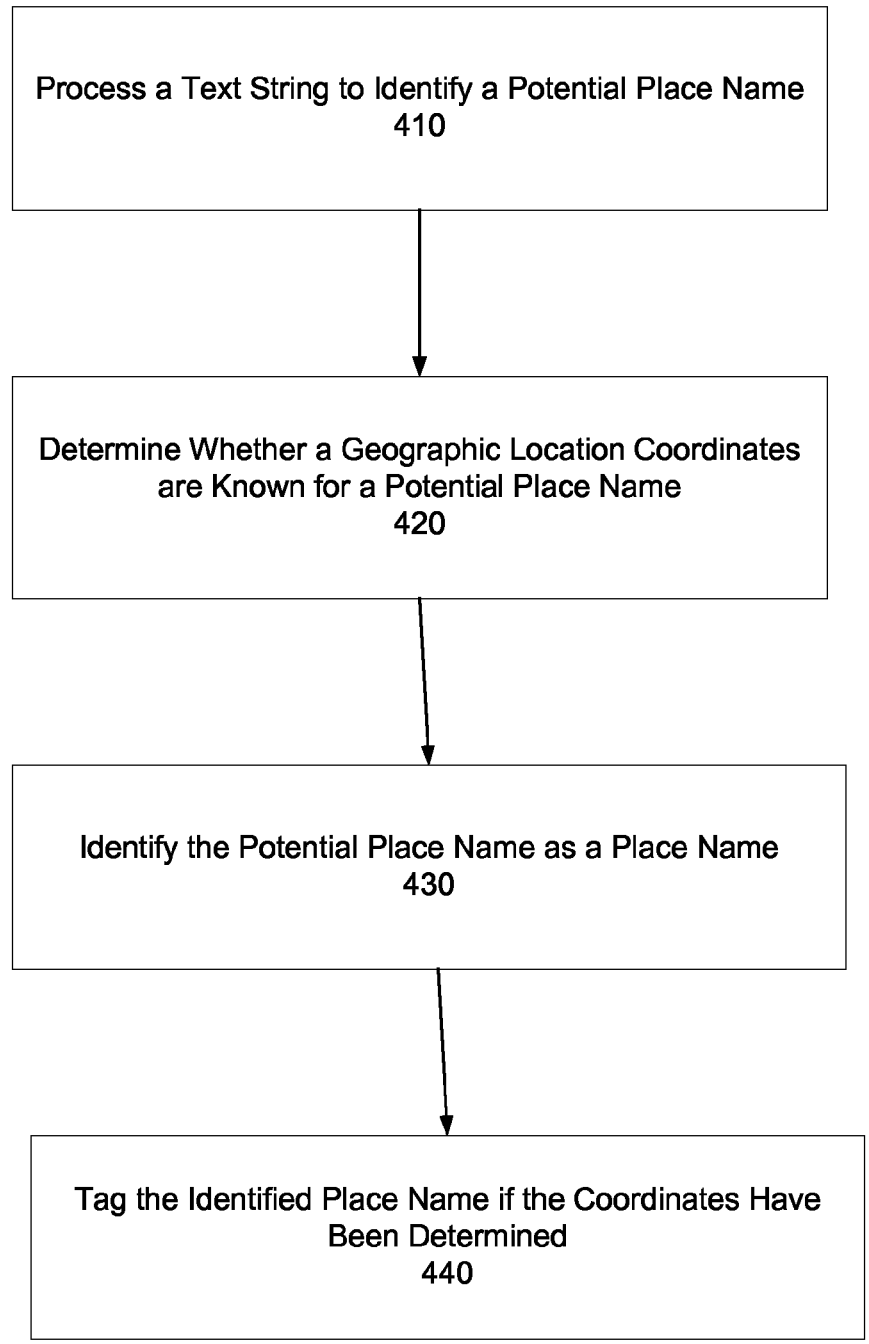
FIG. 4 is a flow chart illustrating a method for associating coordinates with potential place names, according to some implementations.

FIG. 4 is a flow chart illustrating a method of tagging place names with geographic location coordinates, according to some implementations. While the method is described with reference to FIG. 4 a being performed by a geopint janitor 304 on information from one or more websites, the method is also useful in other contexts in which it is desired to identify potential place names and tag the place names with geographic location coordinates, for example, from information stored in a fact repository or other data structure or memory.

According to one embodiment, geopoint janitor 304 processes a text string to identify one or more potential place names 410. The text string may contain multiple sentences (e.g. "I love visiting Las Vegas, as long as the trip lasts no longer than 48 hours. Also, it's best if at least two years have elapsed since my last trip.") The text string may be only a single word (e.g. "Hawaii").

Geopoint janitor 304 processes a text string to identify a potential place name 410 by examining whether the text string contains sequences of one or more capitalized words. For example, in the text, "I visited the Empire State Building in New York City," geopoint janitor 304 would examine the sequences, "I", "Empire State Building" and "New York City." The capitalized words may be one or more capitalized letters, such as "NY" and "N.Y." Geopoint Janitor examines the text string to identify a potential place name in accordance with various rules 308, such as eliminating consideration of certain noise words (e.g., The, Moreover, Although, In, However, I, Mr., Ms.) or not considering the first word of a sentence. In the previous example, the first sequence, "I", would be excluded from consideration based on rules eliminating noise words and/or the first word of a sentence. As another example of a rule 308, geopoint janitor 304 may consider the words preceding and/or following a potential place name. For instance, words after the word "in" in the previous example would be examined because "in" often precedes a place name. Knowledge of what often precedes a place name can be learned through an iterative process. For example, "in" could be learned from the above example if the geopoint janitor 304 already knows that "New York City" is a place.

Figure 5:
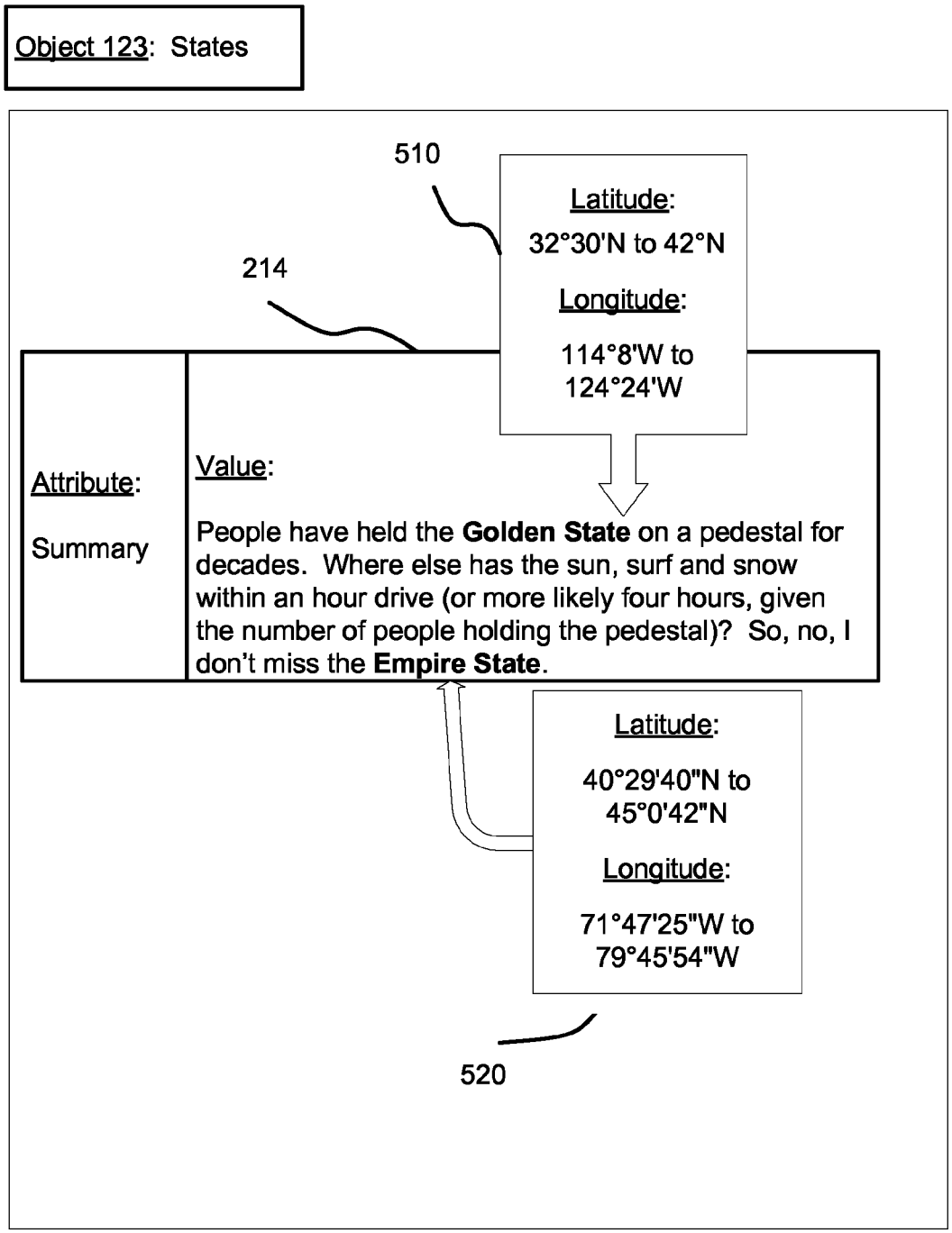
FIG. 5 is an example illustrating a method for associating coordinates with potential place names, according to some implementations.

FIGS. 5 and 6(a) illustrate how the geopoint janitor 304 can recognize variations of a potential place name, according to one embodiment. In FIG. 5, the text string depicted in value 214 has a variation of the state "California" as "Golden State" and the state "New York" as "Empire State." The geopoint janitor 304 can recognize various representations of the same names in variety of ways, such as by examining resources within its memory or accessing a collection of information. In one embodiment, when the variations of the same place name appear in the same text string (e.g. "I love visiting the Empire State; New York is a fabulous place to vacation."), geopoint janitor 304 can store the variations in memory for use in tagging other text strings. Examples of some of the other variations of the place names in FIG. 5 are stored in a computer memory as depicted in FIG. 6(a).

Figure 7:
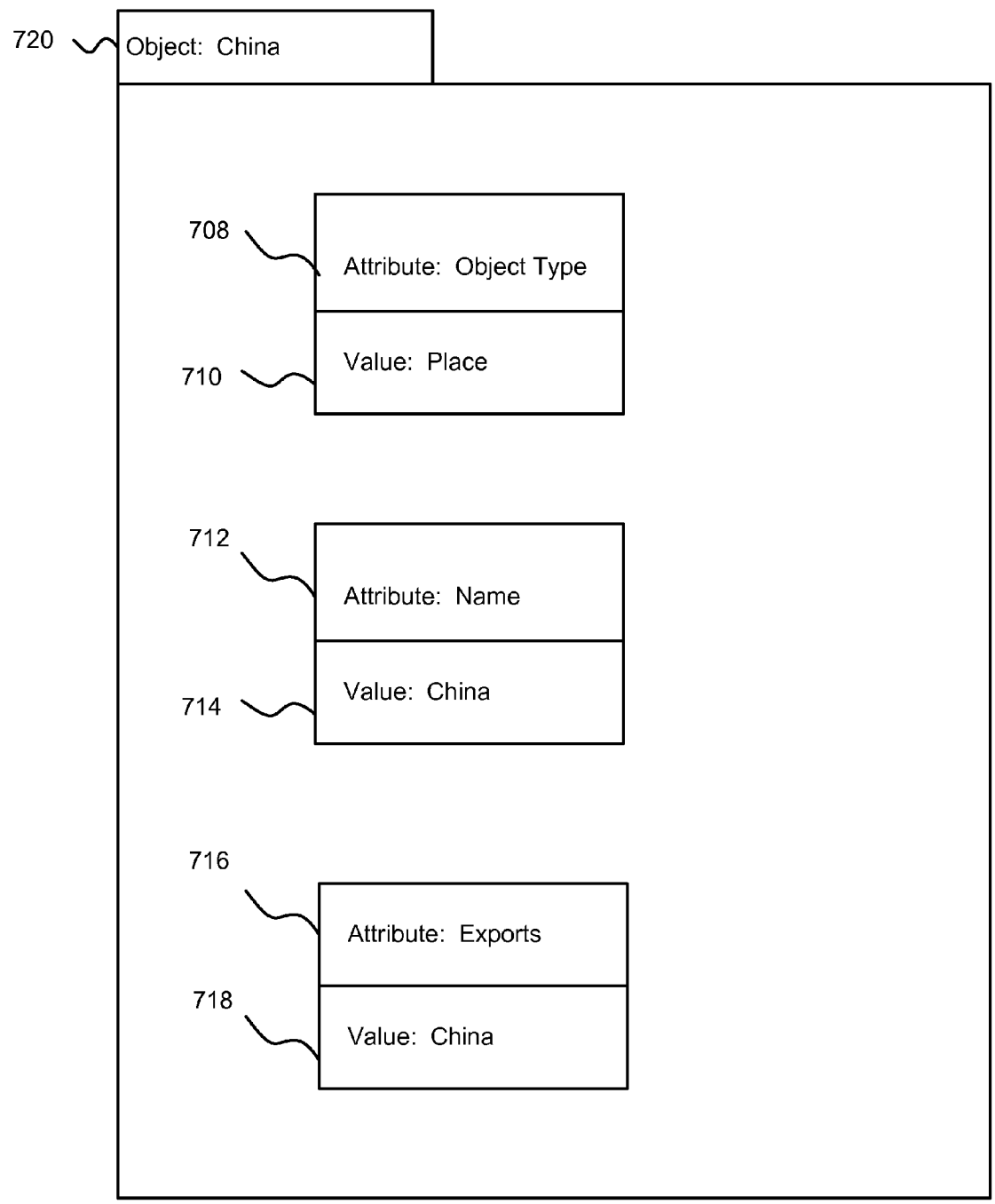
FIG. 7 is an example illustrating a method for determining whether a text string corresponds to a potential place name, according to with some implementations.

Turning now to FIG. 7, another rule 308 that the geopoint janitor 304 may use when processing a text string to identify a potential place name 410 (FIG. 4) is through examining attribute patterns for the attribute name associated with the text string. For example, a fact having as a value a text string that included the word "Turkey" would be ambiguous until the attribute name of the fact was examined. If the attribute name were "Food", this text string would not be identified as containing a potential place name. However, if the attribute name were "Country", the "Turkey" text string would be considered to have a potential place name. For example, the attribute value "China" 714 has an attribute name of "Name." Name 712 is ambiguous and does not help determine whether this "China" represents a place name or not. However, the attribute name 716 for the "China" text string 718 is "Exports" (referring to formal china dishes). It is clear that this text string that has an "exports" attribute would not be a potential place name.

Further, geopoint janitor 304 could also examine object type in determining whether a text string contains potential place name. In FIG. 7, the attribute name 712 for the "China" text string depicted in value 714 is "Name." The geopoint janitor 304 could further examine the object type 708 associated with "Object: China" 720, where the value 710 is "Place", to determine that the "China" text string depicted in value 714 in fact contains a place name (i.e., the name of a place is probably a place name). Therefore, the text string "China" 714, would be considered a potential place name.

Moreover, a rule may be created that if the type of an object (such as "China") is a place and if the attribute name for the text string at issue (associated with that object) is a name, then the text string at issue must contain a place name. This rule may be part of rules 308 (FIG. 3) to be used by Geopoint Janitor 304 in processing text strings to identify a potential place name 410 (FIG. 4).

In addition, the geopoint janitor 304 can determine which attributes are likely associated with location values. For example, if an attribute (i.e. Favorite Place) is determined to correspond to a location value more than a specified proportion of the time, geopoint janitor 304 can create a rule that all values associated with such an attribute are locations. For instance, assume the following facts were available:

EXAMPLE 1A:

Country: United States
Country: Russia
Country: UK

EXAMPLE 1B:

Favorite Place: Argentina
Favorite Place: UK
Favorite Place: The White House

In Example 1A, geopoint janitor 304 might not recognize UK as a place name at first. However, after the United States and Russia were both found to be places, geopoint janitor 304 could make the determination that a "Country" attribute is a "place" and therefore determine that the UK is a place. In Example 1B, after the determination has been made that the UK is a place, and Argentina is a place, geopoint janitor 304 could make the determination that a "Favorite Place" attribute would correspond to a "place" value, so "The White House" is also likely to be a place. Geopoint janitor 304 can then use the expanded list of place-related attributes to search for additional place names.

Figure 8A:
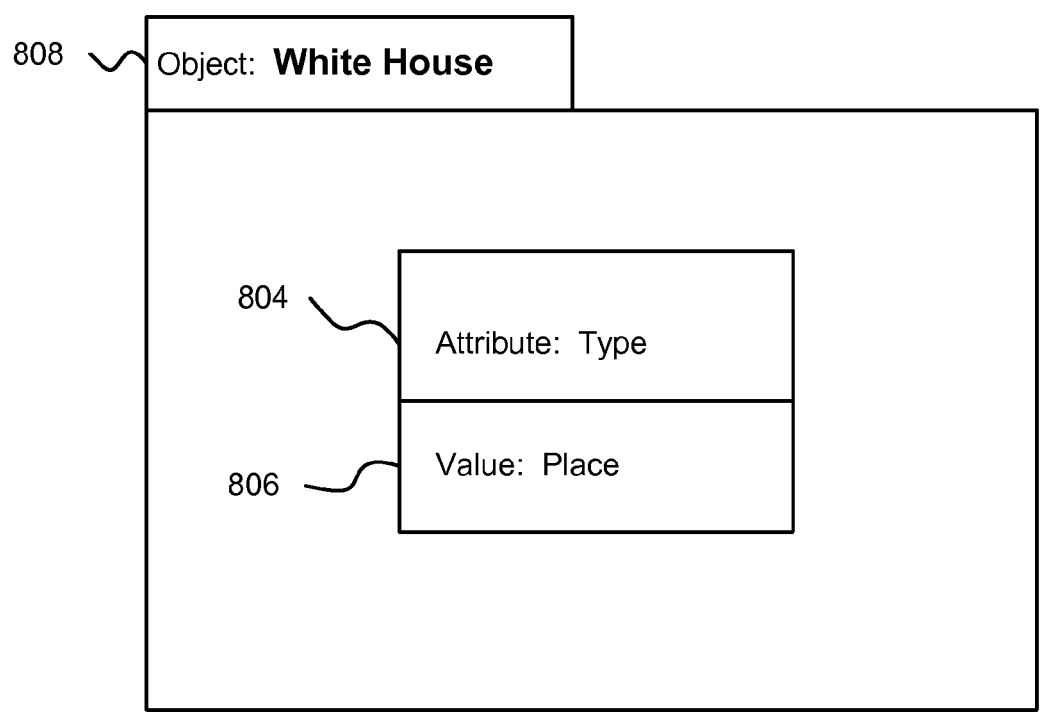
FIGS. 8(a) and 8(b) are examples illustrating a method for determining whether a text string corresponds to a potential place name, according to some implementations.
Figure 8B:
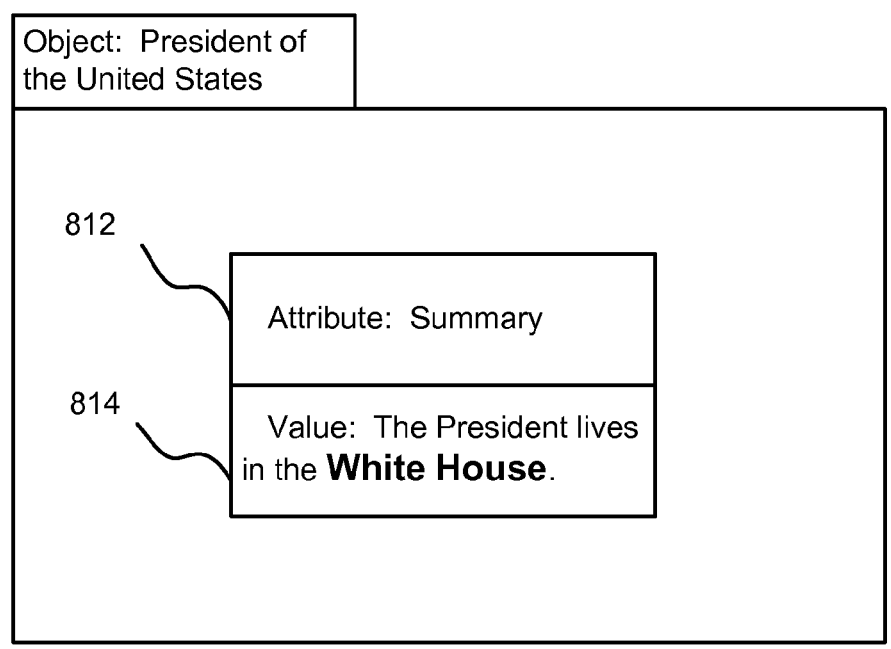

In FIGS. 8(a) and 8(b), a second object is examined to determine whether a text string contains a potential place name. In FIG. 8(b), the text string depicted in value 814 is "The President lives in the White House." Geopoint janitor 304 examines the object type 804 of "Object: White House" 808, which is "place." Because the object type 804 of the "White House" object 808 is a place, geopoint janitor 304 recognizes that the text string "The President lives in the White House" contains the identical words, and therefore "White House" is a place name.

Returning now to FIG. 4, geopoint janitor 304 determines whether geographic location coordinates are known for the potential place name 420. The geopoint janitor 304 makes this determination in variety of ways, such as by examining resources within its memory, for example existing annotated place names 310, by examining a text file 314, or by accessing a collection of information, for example a coordinate lookup service 312.

FIGS. 5 to 6(b) illustrate a method for determining whether geographic location coordinates are known for a potential place name 420, according to some implementations. After the text string in value 214 of FIG. 5 has been processed to identify potential place names, geopoint janitor 304 determines whether there are known geographic location coordinates associated with the potential place name through examining existing annotated place names 310, by examining a text file 314, and/or accessing a coordinate lookup service 312, according to one embodiment. For example, in FIG. 6(b), the geographic location coordinates for the California and New York place names are shown stored in a computer memory. A lookup function for "California," for example, will result in the latitude and longitude (or, here, the latitude and longitude ranges) for California. One of ordinary skill in the art will recognize there are various ways of providing and accessing a lookup service in addition to those illustrated in FIGS. 6(a) and 6(b).

Figure 9:
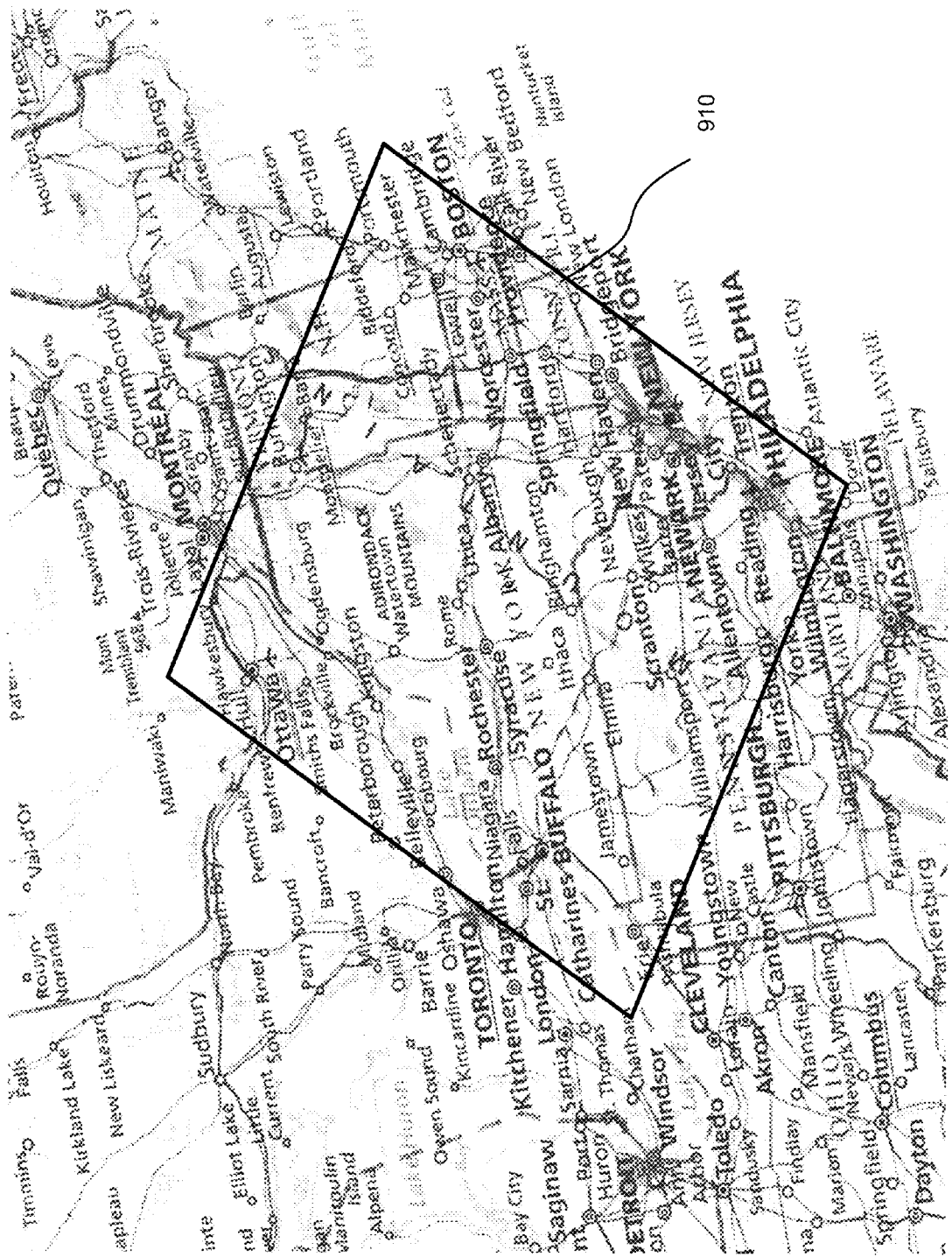
FIG. 9 is an example of a bounding box that would be assigned to a place name.

The lookup functions described above may yield various results. In one embodiment, a look up yields a place name with a latitude and a longitude. In another embodiment, the lookup results in the determination that the potential place name is in fact a place name, though it does not have location coordinates. Another lookup result is a place name with a bounding area 910 that has a latitude and longitude coordinate range, as shown for example in FIG. 9. In the example of a bounding area 910, depicted for New York State, parts of Canada, the Atlantic Ocean and other states are encapsulated within that area. Although a box shape is depicted in FIG. 9, a circle, polygon, rectangle or any other shape may be used as a bounding area. A line or point may also be used as a bounding area, or a set of unconnected circles, polygons, rectangles, lines, points, or other shapes may also define a bounding area. For example, the bounding area for the "United States" object might include a rectangle to represent the continental 48 states, a circle to represent Alaska, and a triangle to represent Hawaii.

When a lookup returns conflicting results, geopoint janitor 304 provides various disambiguation techniques for resolving the differences. In one embodiment, the lookup result that occurs most frequently is the preferred result. For example, if the lookup of a "New York" string returned one geolocation of "New York City" and another of "New York State", the preferred result would be the result that appears most frequently.

Figure 10:
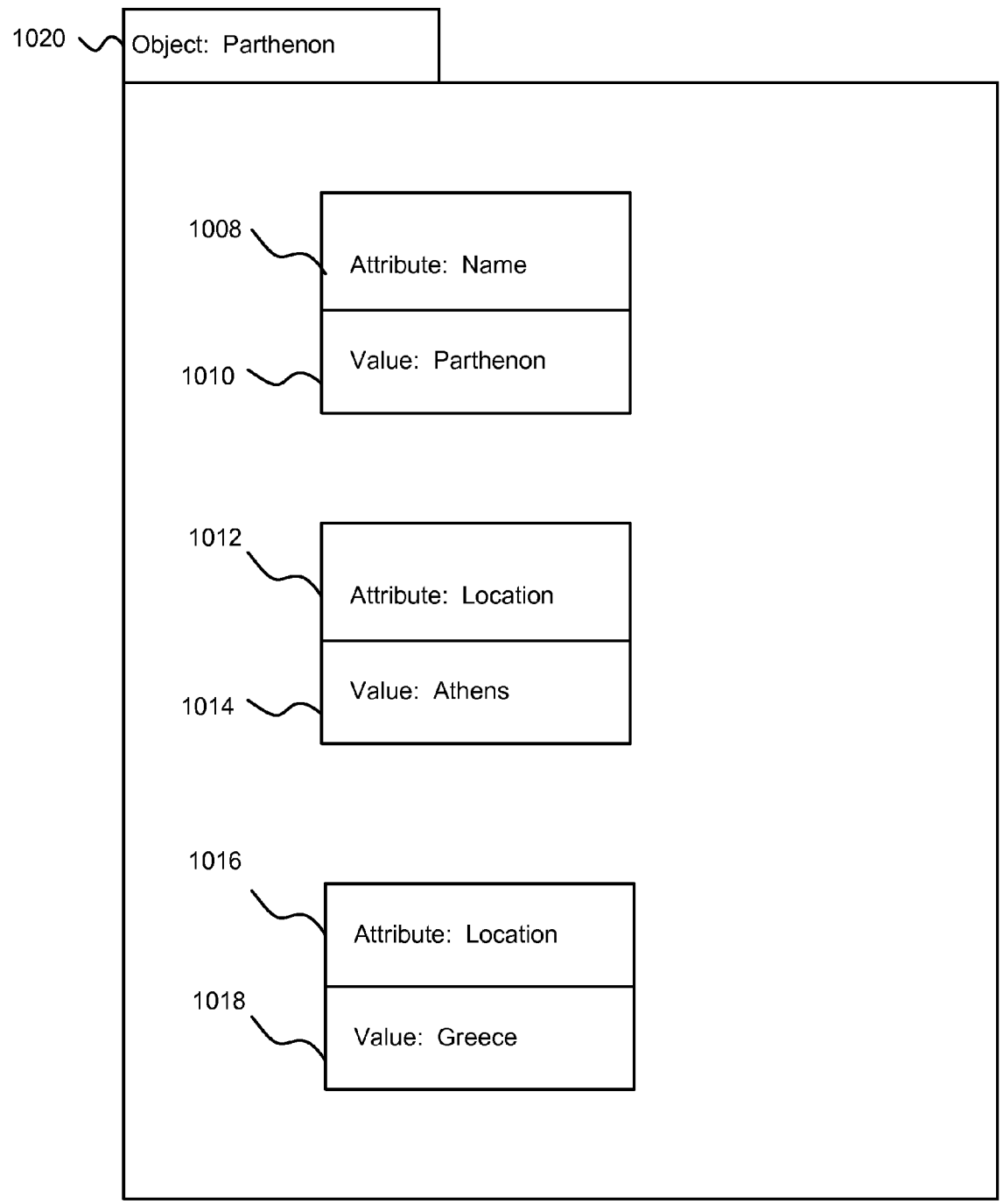
FIG. 10 is an example of input data in need of disambiguation.

In another embodiment, geopoint janitor 304 would examine the overlap of the returned results for disambiguation. FIG. 10 is an example of when different lookup results might occur and a technique for using the overlap of the results to disambiguate the returned results. In FIG. 10, the Parthenon Object 1020 has one fact with the location being Athens 1014 (from website xyz.com, for example) and another fact with the location being Greece 1018 (from website abc.com, for example). After applying the lookup to the "Athens" value 1014, geopoint janitor 304 finds that "Athens" has two sets of potential location coordinates: one potential set of location coordinates in Georgia and another potential location coordinates in Greece. After applying the lookup to the "Greece" value 1018, geopoint janitor 304 finds only one set of geographic location coordinates for the country of Greece. To resolve the ambiguity, geopoint janitor 304 can look in the same fact, according to one embodiment. For example, if the fact were "My favorite place to visit in Greece is Athens", geopoint janitor 304 could determine that Athens is in Greece based on the context of the fact. In another embodiment, geopoint janitor 304 could examine other facts on this object, such as the fact "Athens, Greece" with a location attribute. Facts with a "location" attribute could be weighted more heavily in the disambiguation determination, according to one embodiment.

The geopoint janitor 304 could also look at the context of the original source document, such as a web page from which the document was extracted. For example, if the source page describes Greek history, has Greek words on it, or is from a .gr domain, the geopoint janitor 304 would select the geopoint location coordinates in Greece rather than those in Georgia.

Figure 11:
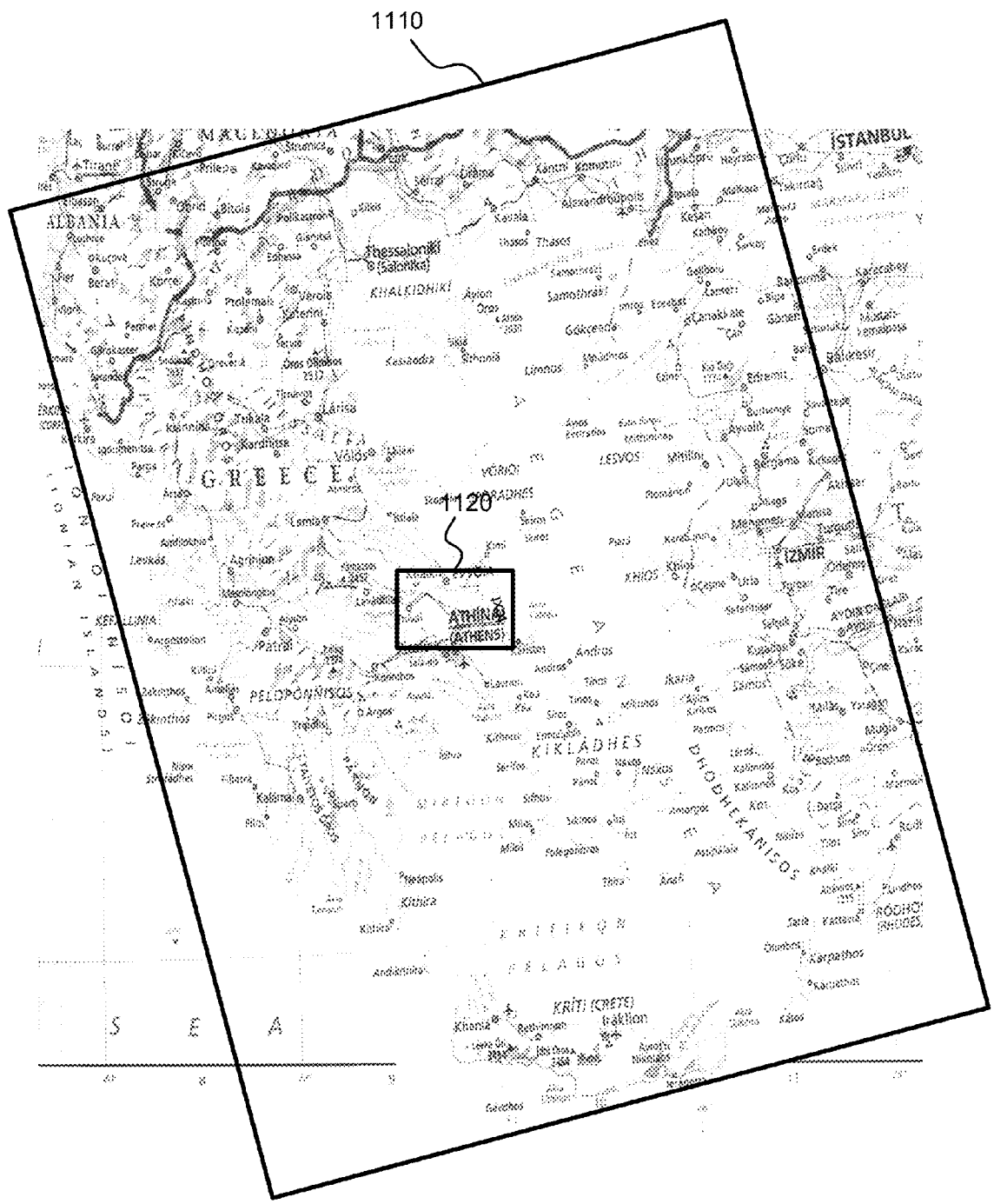
FIG. 11 is an example of a method for determining geographic location coordinates for an ambiguous potential place name.

In another embodiment, the geopoint janitor 304 determines any overlap between the potential geographic location coordinates and various location facts. As shown in FIG. 11, the boundary area for Greece 1110 overlaps with that for Athens, Greece 1120. As such, the potential location coordinates for the Athens in Georgia can be disregarded as incorrect, and the potential location coordinates for the entire country of Greece can be disregarded as too general. In another embodiment, geopoint janitor 304 would determine if the potential geolocation coordinates overlap or are a determined distance away from coordinates for another related fact in selecting the appropriate geolocation coordinates.

Returning now to FIG. 4, geopoint janitor 304 identifies 430 the first potential place name as a place name and tags 440 the place name if the geographic location coordinates have been determined 440. The tags may be located anywhere in the memory of the computer system. An illustration of tagging is shown in FIG. 5. For example, the potential place name of "Golden State" has been determined to be "California" from the table depicted in FIG. 6(*a*), as described above, and the geographic location coordinates are obtained from the table depicted in FIG. 6(*b*). The place name is then tagged, as shown in reference numeral 510, with its respective known geographic location coordinates.

Similarly, the potential place name of "Empire State" in FIG. 5 has been determined to be "New York" from the table depicted in FIG. 6(*a*), and the geographic location coordinates are obtained from the table depicted in FIG. 6(*b*). The place name is then tagged, as shown in reference numeral 520, with its respective known geographic location coordinates. One of ordinary skill in the art will recognize there are various ways of tagging place names in addition to those illustrated in FIG. 5.

Reference in the specification to "one embodiment" or to "an embodiment" means that a particular feature, structure, or characteristic described in connection with the embodiments is included in at least one embodiment of the disclosed herein. The appearances of the phrase "in one embodiment" in various places in the specification are not necessarily all referring to the same embodiment.

Some portions of the above are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, text strings, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the disclosed implementations include process steps and instructions described herein in the form of a method. It should be noted that the process steps and instructions of the disclosed implementations can be embodied in software, firmware or hardware, and when embodied in software, can be downloaded to reside on and be operated from different platforms used by a variety of operating systems.

The disclosed implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the disclosed implementations are not described with reference to any particular programming language. It will be appreciated that a variety of programming languages may be used to implement the teachings of the disclosed implementations as described herein, and any references below to specific languages are provided for disclosure of enablement and best mode of the disclosed implementations.

While the disclosed implementations have been particularly shown and described with reference to one embodiment and several alternate embodiments, it will be understood by persons skilled in the relevant art that various changes in form and details can be made therein without departing from the spirit and scope of the disclosed implementations.

Finally, it should be noted that the language used in the specification has been principally selected for readability and instructional purposes, and may not have been selected to delineate or circumscribe the inventive subject matter. Accordingly, the present disclosure is intended to be illustrative, but not limiting, of the scope of the disclosed implementations, which is set forth in the following claims.

What is claimed is:

1. A computer-implemented method comprising: at a server system having one or more processors and memory storing a plurality of facts and programs for execution by the one or more processors:
retrieving a first fact from the memory, the first fact having a first attribute and a first value, wherein the first attribute is a text string and the first attribute and the first value were extracted from free text in one or more source documents;
determining that the first attribute indicates that the first value is a potential place name; and
in response to the determining:
identifying a first potential place name corresponding to the first value,
determining two or more possible geographic location coordinates for the first potential place name,
determining that the two or more possible geographic location coordinates are conflicting,
disambiguating between the conflicting possible geographic location coordinates to select first geographic location coordinates for the first potential place name by identifying other facts related to the first fact and selecting the first geographic location coordinates for the first potential place name based on distance to geographic coordinate locations associated with the other facts, and
storing the first geographic location coordinates in the memory, the storing including associating the first geographic location coordinates with the first fact.

2. The method of claim 1, wherein storing the first geographic location coordinates includes tagging the first potential place name with the first geographic location coordinates.

3. The method of claim 2, wherein tagging includes converting the first potential place name into a hyperlink to a map view.

4. The method of claim 1, wherein disambiguating between the conflicting possible geographic location coordinates includes examining a source document from the one or more source documents for context.

5. The method of claim 1, wherein determining geographic location coordinates for the first potential place name comprises examining a plurality of place names, wherein each of the plurality of place names has been tagged previously with its respective geographic location coordinates.

6. The method of claim 1, wherein the geographic location coordinates for the first potential place name comprise the geographic location coordinates for a bounding area.

7. The method of claim 1, wherein disambiguating between the conflicting possible geographic location coordinates comprises:
determining an object related to the fact;
comparing the two or more possible geographic location coordinates for the first potential place name with geographic location coordinates for an identified place name in a second fact also related to the object; and
retaining, as the first geographic location coordinates, the potential geographic location coordinates for the first potential place name that have overlapping bounding areas with the geographic location coordinates for the identified place name.

8. The method of claim 1, wherein determining geographic location coordinates for the first potential place name comprises comparing potential geographic location coordinates for the first potential place name with the geographic location coordinates for an identified place name from a same source document as the source document containing the first potential place name.

9. A server system comprising:
at least one processor; and
memory storing a plurality of facts and instructions that, when executed by the at least one processor, cause the server system to perform operations including:
retrieving a first fact from the memory, the first fact having a first attribute and a first value, wherein the first attribute is a text string and the first attribute and the first value were extracted from free text in a source document;
determining that the first attribute indicates that the first value is a potential place name; and
in response to the determining:
identifying a first potential place name corresponding to the first value,
determining two or more possible geographic location coordinates for the first potential place name,
determining that the two or more possible geographic location coordinates are conflicting,
disambiguating between the conflicting possible geographic location coordinates to select first geographic location coordinates for the first potential place name based at least in part on context retrieved by examining the source document, and
storing the first geographic location coordinates in the memory, the storing including associating the first geographic location coordinates with the first fact.

10. The server system of claim 9, wherein disambiguating between the conflicting possible geographic location coordinates includes:
identifying other facts related to the first fact; and
comparing potential coordinates with location attributes for the other facts.

11. The server system of claim 9, wherein identifying a first potential place name comprises comparing the first potential place name with a previously identified place name associated with a second fact previously stored in the memory.

12. The server system of claim 9, wherein determining geographic location coordinates for the first potential place name comprises examining a plurality of place names, wherein each of the plurality of place names has been tagged previously with its respective geographic location coordinates.

13. The server system of claim 9, wherein the geographic location coordinates for the first potential place name comprise the geographic location coordinates for a bounding area.

14. The server system of claim 9, wherein disambiguating between the conflicting possible geographic location coordinates comprises:
   determining an object related to the fact;
   comparing the two or more possible geographic location coordinates for the first potential place name with geographic location coordinates for an identified place name in a second fact also related to the object; and
   retaining, as the first geographic location coordinates, the potential geographic location coordinates for the first potential place name that have overlapping bounding areas with the geographic location coordinates for the identified place name.

15. The server system of claim 9, wherein storing the first geographic location coordinates includes tagging the first potential place name with the first geographic location coordinates.

16. The server system of claim 15, wherein tagging includes converting the first potential place name into a hyperlink to a map view using the first geographic location coordinates.

17. A computer-implemented method, comprising: at a server system having one or more processors and memory storing a plurality of facts and programs for execution by the one or more processors:
   retrieving a first fact from the memory, the first fact having a first attribute and a first value, wherein the first attribute is a text string and the first attribute and the first value were extracted from free text in one or more source documents;
   determining that the first attribute indicates that the first value is a potential place name; and
   in response to the determining:
      identifying a first potential place name corresponding to the first value,
      identifying at least two location facts for the first potential place name,
      determining at least two geographic location coordinates for the first potential place name from the identified at least two location facts, wherein each of the two geographic location coordinates for the first potential place name comprise the geographic location coordinates for a bounding area surrounding the first potential place name, the bounding area having a shape,
      determining that the at least two geographic location coordinates from the identified at least two location facts for the first potential place name overlap based on comparing the at least two geographic location coordinates,
      responsive to determining that at least two geographic location coordinates from the identified at least two location facts overlap, disambiguating between the overlapping geographic location coordinates to determine first geographic location coordinates, and
      storing the first geographic location coordinates in the memory, the storing including associating the first geographic location coordinates with the first fact.

18. The method of claim 17, wherein the shape of the bounding area is a circle, a triangle, a rectangle, a polygon, or a line.

19. The method of claim 17, wherein disambiguating between the overlapping geographic location coordinates includes disregarding one of the at least two geographic location coordinates due to the one geographic location coordinate overlapping an entirety of another of the at least two geographic location coordinates.

* * * * *

UNITED STATES PATENT AND TRADEMARK OFFICE
CERTIFICATE OF CORRECTION

PATENT NO. : 9,892,132 B2
APPLICATION NO. : 13/732157
DATED : February 13, 2018
INVENTOR(S) : Vespe et al.

Page 1 of 2

It is certified that error appears in the above-identified patent and that said Letters Patent is hereby corrected as shown below:

On the Title Page

Column 2, Item (74), in "Attorney, Agent, or Firm", Line 1, delete "Bellerman" and insert
-- Bellermann --, therefor.

On Page 2, Column 1, Item (56), under "U.S. PATENT DOCUMENTS", Line 41, delete "Liddy" and
insert -- Liddy et al. --, therefor.

On Page 2, Column 2, Item (56), under "U.S. PATENT DOCUMENTS", Line 4, delete "Sheth" and
insert -- Sheth et al. --, therefor.

On Page 3, Column 2, Item (56), under "U.S. PATENT DOCUMENTS", Line 1, delete "Ra et al."
and insert -- Raj et al. --, therefor.

On Page 3, Column 2, Item (56), under "U.S. PATENT DOCUMENTS", Line 8, delete "Leon et al."
and insert -- Leong et al. --, therefor.

On Page 3, Column 2, Item (56), under "U.S. PATENT DOCUMENTS", Line 57, delete
"Seumniotales et al." and insert -- Scumniotales et al. --, therefor.

On Page 3, Column 2, Item (56), under "U.S. PATENT DOCUMENTS", Line 64, delete
"A Uilera et al." and insert -- Aguilera et al. --, therefor.

On Page 4, Column 1, Item (56), under "U.S. PATENT DOCUMENTS", Line 4, delete "Chidiae et
al." and insert -- Chidiac et al. --, therefor.

On Page 4, Column 1, Item (56), under "U.S. PATENT DOCUMENTS", Line 33, delete "Nod et al."
and insert -- Nori et al. --, therefor.

Signed and Sealed this
Fourth Day of December, 2018

Andrei Iancu
*Director of the United States Patent and Trademark Office*

CERTIFICATE OF CORRECTION (continued)
U.S. Pat. No. 9,892,132 B2

On Page 4, Column 1, Item (56), under "U.S. PATENT DOCUMENTS", Line 37, delete "May-Field et al." and insert -- Mayfield et al. --, therefor.

On Page 5, Column 1, Item (56), under "OTHER PUBLICATIONS", Line 1, delete "Snowball estracting" and insert -- Snowball: Extracting --, therefor.

On Page 6, Column 2, Item (56), under "OTHER PUBLICATIONS", Line 9, delete "Ifogue," and insert -- Hogue, --, therefor.

On Page 6, Column 2, Item (56), under "OTHER PUBLICATIONS", Line 48, delete "tagging." and insert -- tagging, --, therefor.

On Page 7, Column 1, Item (56), under "OTHER PUBLICATIONS", Line 28, delete "Mihalcca," and insert -- Mihalcea, --, therefor.

On Page 7, Column 1, Item (56), under "OTHER PUBLICATIONS", Line 40, delete "Pagc,L." and insert -- Page,L. --, therefor.